(12) United States Patent
Owashi et al.

(10) Patent No.: US 8,778,107 B2
(45) Date of Patent: Jul. 15, 2014

(54) METHOD FOR PRODUCING REVERSIBLE THERMOSENSITIVE RECORDING MEDIUM, PRODUCTION APPARATUS FOR THE SAME, AND REVERSIBLE THERMOSENSITIVE RECORDING MEDIUM

(75) Inventors: Takeshi Owashi, Shizuoka (JP); Noboru Koga, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 442 days.

(21) Appl. No.: 13/041,832

(22) Filed: Mar. 7, 2011

(65) Prior Publication Data
US 2011/0224073 A1   Sep. 15, 2011

(30) Foreign Application Priority Data

Mar. 9, 2010 (JP) ................................. 2010-051629

(51) Int. Cl.
*B32B 41/00* (2006.01)

(52) U.S. Cl.
USPC .............. 156/64; 156/351; 156/361; 156/378

(58) Field of Classification Search
USPC ............ 156/64, 351, 361, 362, 366, 378, 379
See application file for complete search history.

(56) References Cited

U.S. PATENT DOCUMENTS

| | | | | |
|---|---|---|---|---|
| 5,397,427 A | * | 3/1995 | Traise et al. | ................... 156/555 |
| 5,867,102 A | * | 2/1999 | Souder et al. | .............. 340/572.8 |
| 6,451,154 B1 | * | 9/2002 | Grabau et al. | ................ 156/300 |
| 2004/0154161 A1 | * | 8/2004 | Aoyama et al. | .................. 29/739 |
| 2009/0170699 A1 | * | 7/2009 | Tatewaki et al. | .............. 503/218 |
| 2009/0230198 A1 | * | 9/2009 | Armijo et al. | ................. 235/492 |

FOREIGN PATENT DOCUMENTS

| | | | |
|---|---|---|---|
| FR | 2786902 A1 | | 6/2000 |
| JP | 63056435 A | * | 3/1988 |
| JP | 2003-226313 | | 8/2003 |
| JP | 2006-520277 | | 9/2006 |
| JP | 2008-162077 | | 7/2008 |
| JP | 2009-129217 | | 6/2009 |
| WO | WO99/26197 | | 5/1999 |

OTHER PUBLICATIONS

Chinese official action dated Apr. 26, 2013 in corresponding Chinese patent application No. 2011 10 05 8832.5.
European Search Report dated Jan. 16, 2014 in corresponding European patent application No. 1125 02 62.0.

* cited by examiner

*Primary Examiner* — George Koch
(74) *Attorney, Agent, or Firm* — Cooper & Dunham LLP

(57) ABSTRACT

The present invention provides a method for producing a reversible thermosensitive recording medium, the method including: conveying an inlet sheet which includes inlets each having a convex-shaped electronic information recording element, retrieving positional information of the inlets, cutting the inlet sheet into individual inlets, retrieving positional information of the convex-shaped electronic information recording element in the individual inlets, conveying a base sheet, which includes concave portions, toward the vacuum suction roller, retrieving positional information of the concave portions, aligning the convex-shaped electronic information recording element with the concave portions so as to be inserted into the concave portion, and laminating the inlets and the base sheet.

18 Claims, 10 Drawing Sheets

METHOD FOR PRODUCING REVERSIBLE THERMOSENSITIVE RECORDING MEDIUM, PRODUCTION APPARATUS FOR THE SAME, AND REVERSIBLE THERMOSENSITIVE RECORDING MEDIUM

BACKGROUND OF THE INVENTION

1. Field of the Invention

The present invention relates to a method for producing a reversible thermosensitive recording medium having an inlet (electronic information recording section), a production apparatus for the same, and a reversible thermosensitive recording medium.

2. Description of the Related Art

IC cards have been increasingly used in various aspects from users' daily lives to business activities. Actually, they are used as various cards (e.g., cash cards, credit cards, prepaid cards and ETC cards (electronic toll collection system)); in transportation facilities (e.g., railways and buses); as affiliate cards for digital broadcasting, 3rd generation mobile phones, etc.; in library service counters; and as student ID cards, employee ID cards, basic resident register cards, etc. Meanwhile, the amount of IC cards disposed of has been being increasing in accordance with diversification of the current economic and social activities.

In view of this, there is a keen need to create a recycling society, where material consumption is reduced and less environmental load is given, by reconsidering the current economic societies and lifestyles involving mass production, mass consumption and mass disposal to promote effective utilization and recycling of materials.

As one promising measure, electronic information recording module-embedded reversible thermosensitive recording media, wherein the electronic information recording module includes an electronic information recording element (hereinafter may be referred to as an "IC chip") and an antenna circuit, can be used for reducing the amount of products disposed of. This is because they can rewrite information stored in the IC chip and show information as a visible image on their surface.

Such electronic information recording module-embedded reversible thermosensitive recording media have been used in the manufacturing industry as instruction sheets such as operation sheets, parts management sheets and process management sheets. Actually, there is repeatedly performed a cycle including winding an instruction sheet around a rod-like part or inserting it into a card case, and rewriting the content of the instruction sheet.

When an image is formed on or erased from it, a heating device (e.g., thermal head, erase bar, erase roller and erase plate) of the printer is pressed against the instruction sheet. Thus, rewriting of a print image on the instruction sheet (reversible thermosensitive recording medium) must be performed so as not to break the electronic information recording module and not to avoid outflow of an adhesive from an adhesion portion between the electronic information recording module and the reversible thermosensitive recording medium. Furthermore, desirably, the instruction sheet is flexible and shows a high-quality image.

Moreover, a tag may be bent when the tag placed on a table surface is picked up, and a tag is taken out from a tag holder in an outer frame on a box. Thus, when the tag is picked up by hands upon operation, it is demanded that the tag be easily handled by flexibly changing its shape without locally bending its shape.

Moreover, it is demanded to provide a reversible thermosensitive recording medium which is recovered from a shape varied upon holding to a flat shape at high speed which is capable of reducing conveying failure and jam caused by curling or surface waviness in the printer when the reversible thermosensitive recording medium is rapidly picked up and fed to a printer for image formation and erasure immediately after being held. Moreover, it is also demanded that a printer be filled with thermosensitive recording media (tags) as many as possible so as to decrease the number of access to the printer and shorten operation time, to thereby improve efficiency of operation in the field.

Furthermore, in addition to imparting various properties such as flexibility to a reversible thermosensitive recording medium, in order to increase the number of thermosensitive recording media fed to a printer, it is important to make the reversible thermosensitive recording medium thin, and thus, it is demanded to reduce the total thickness of a tag.

High print quality of images is maintained by improving close-contact properties of the surface of a thermosensitive recording layer with a printer head.

However, the thickness of an IC chip of an electronic information recording element cause a bottleneck to reduce the total thickness of a reversible thermosensitive recording medium. By solving the problem with the thickness of an IC chip, the total thickness of a reversible thermosensitive recording medium can be made thin while the surface of a reversible thermosensitive recording medium being kept smooth.

Conventionally, to solve the problem with the thickness of such an IC chip, there have been provided a method of producing a reversible thermosensitive recording medium and a production apparatus thereof using a technique of forming a through hole for housing an IC chip in a base material serving as a base and inserting the IC chip into the through hole (see Japanese Patent Application Laid-Open (JP-A) No. 2009-129217).

This proposal aims to achieve high-precision registration for inserting an IC chip in a through hole formed in a base material. After formation of a through hole, the operation is stopped at a certain position, and positional operation is performed so that the hole corresponds to the position of the IC chip, followed by lamination of the base material with an inlet, thereby achieving high-precision registration.

However, in this proposal, the laminating the base material with the inlet is designed as an intermittent operation in which a stop of the lamination and conveyance are intermittently repeated, and these members are laminated in an area contact during stop of the operation, and thus, unfavorably, air bubbles are easily included between the base material and the inlet in the lamination process.

In addition, when an adhesive is used in lamination of the base material and the inlet, the adhesive coating step is included before the lamination. When this operational process is performed intermittently, it is difficult to uniformly apply the adhesive to the base material in the conveyance direction of the base material, the thickness of the resulting product is liable to vary, in addition to decreasing in the efficiency of positioning adjustment.

Further, in the above proposal, the hole into which an IC chip is inserted is a through hole, and the position of the IC chip is detected below the through hole to perform positional correction. When the base material is a base onto which a reversible thermosensitive recording layer is applied, a through hole cannot be formed in the surface of the reversible thermosensitive recording layer for allowing the resulting reversible thermosensitive recording medium to exhibit necessary functions. Therefore, the proposal has a drawback in that the position of the IC chip cannot be detected and lamination ensuring high-precision positioning cannot be achieved.

The above-mentioned problems cause concave-convex portions in a surface of a reversible thermosensitive recording medium, and this leads to recording failure and erasure failure in printing with a printer.

BRIEF SUMMARY OF THE INVENTION

An object of the present invention is to provide a method for producing a reversible thermosensitive recording medium and a reversible thermosensitive recording medium production apparatus each of which enables aligning, with high precision, a convex-shaped electronic information recording element with a concave portion in which the convex-shaped electronic information recording element is housed, so that the recording element is laminated on a base sheet, preventing air bubbles from being included in the reversible thermosensitive recording medium to prevent recording failure and print failure caused by concave-convexes of a surface of the recording medium, continuously producing a reversible thermosensitive recording medium with high efficiency, and further producing reversible thermosensitive recording media having a variety of different sizes; and a reversible thermosensitive recording medium obtained by the method and apparatus.

Means for solving the above-mentioned problems are as follows:

<1> A method for producing a reversible thermosensitive recording medium, the method including:

conveying an inlet sheet which includes inlets each of which has a convex-shaped electronic information recording element and an antenna circuit on a circuit board, retrieving positional information of the inlets by detecting the position of the inlets in the inlet sheet, cutting the inlet sheet into individual inlets based on the positional information of the inlets, retrieving positional information of the convex-shaped electronic information recording element in the individual inlets on a vacuum suction roller which is rotatable with the individual inlets being adsorbed on a surface thereof, conveying a base sheet, which comprises a reversible thermosensitive recording layer and a plurality of concave portions in a surface thereof opposite to a surface thereof on which the reversible thermosensitive recording layer is provided, toward the vacuum suction roller, retrieving positional information of each of the concave portions in the base sheet by detecting the position of the concave portion, aligning the convex-shaped electronic information recording element with the concave portion based on the positional information of the convex-shaped electronic information recording element and the positional information of the concave portion, so that the convex-shaped electronic information recording element is inserted into the concave portion, and laminating the inlets and the base sheet by allowing the base sheet to pass between the vacuum suction roller and a lamination roller after the aligning.

<2> The method for producing a reversible thermosensitive recording medium according to <1> above, wherein the conveying the inlet sheet is conveying the inlet sheet onto the vacuum suction roller, and the inlet sheet is conveyed by being sandwiched between two inlet sheet-feed rollers which enables an intermittent driving operation so that conveyance of the inlet sheet and a stop of the conveyance are repeatedly performed.

<3> The method for producing a reversible thermosensitive recording medium according to <2> above, wherein of the two inlet sheet-feed rollers, one inlet sheet-feed roller which is brought into contact with the surface of the inlet sheet provided with the convex-shaped electronic information recording element has a concave portion in which the convex-shaped electronic information recording element can be housed.

<4> The method for producing a reversible thermosensitive recording medium according to one of <2> and <3> above, wherein the retrieving the positional information of the inlets is retrieving the positional information of the inlets in the inlet sheet on the vacuum suction roller, the detecting the position of the inlets in the retrieving the positional information of the inlets is performed by an inlet detection sensor which detects a length of each of the inlets in a conveying direction thereof, and the two inlet sheet-feed rollers are feed-back controlled in the conveying based on the detection result.

<5> The method for producing a reversible thermosensitive recording medium according to any one of <1> to <4> above, wherein the cutting the inlet sheet is cutting the inlet sheet into the individual inlets on the vacuum suction roller, and the cutting of the inlet sheet in the cutting is performed while scanning the inlet sheet in motion with a laser beam.

<6> The method for producing a reversible thermosensitive recording medium according to <5> above, wherein a focal length of the laser beam can be changed.

<7> The method for producing a reversible thermosensitive recording medium according to any one of <1> to <6> above, wherein the cutting the inlet sheet is cutting the inlet sheet into the individual inlets on the vacuum suction roller, and the cutting in the cutting the inlet sheet is effected by shearing.

<8> The method for producing a reversible thermosensitive recording medium according to any one of <1> to <7> above, wherein the cutting in the cutting the inlet sheet is effected to the inlet sheet which is conveyed at the same speed as the rotational speed of the vacuum suction roller.

<9> The method for producing a reversible thermosensitive recording medium according to any one of <1> to <8> above, wherein the positional information of the convex-shaped electronic information recording element in the retrieving the positional information of the convex-shaped electronic information recording element is retrieved by detecting one of the position of the convex-shaped electronic information recording element in the inlet moving on the vacuum suction roller and an arbitrary position in the antenna circuit.

<10> The method for producing a reversible thermosensitive recording medium according to <1> above, further including: transferring the inlets onto the vacuum suction roller by a transfer unit.

<11> The method for producing a reversible thermosensitive recording medium according to any one of <1> to <10> above, wherein the detecting the positional information of the convex-shaped electronic information recording element in the detecting the positional information of the convex-shaped electronic information recording element is performed by a convex portion-detecting sensor which detects the convex-shaped electronic information recording element and outputs positional information of the convex-shaped electronic information recording element which includes difference information between the position of the detected convex-shaped electronic information recording element and a reference position of the convex-shaped electronic information recording element set by a size of the detected inlet or a pitch interval between the convex-shaped electronic information recording elements arranged adjacent to each other.

<12> The method for producing a reversible thermosensitive recording medium according to any one of <1> to <11> above, wherein an adhesive material is applied to a surface of the base sheet provided with the concave portion, which is conveyed in the conveying.

<13> The method for producing a reversible thermosensitive recording medium according to any one of <1> to <12> above, wherein the detecting the position of the concave portion in the retrieving the positional information of the concave portion is performed by a concave portion-detection sensor which detects the concave portion or a register mark indicating the position of the base sheet and outputs positional information of the concave portion which includes difference information between the position of the detected concave portion and a reference position of the concave portion set by a size of the base sheet or a pitch interval between the concave portions arranged adjacent to each other.

<14> The method for producing a reversible thermosensitive recording medium according to any one of <1> to <13> above, wherein the aligning includes correcting the position of the convex-shaped electronic information recording element based on the positional information of the convex-shaped electronic information recording element and the positional information of the concave portion, while controlling a rotation drive of at least the vacuum suction roller.

<15> The method for producing a reversible thermosensitive recording medium according to <14> above, wherein the correcting the position in the aligning is performed by synchronizing a pulse signal generated from the positional information of the convex-shaped electronic information recording element with a pulse signal generated from the positional information of the concave portion.

<16> The method for producing a reversible thermosensitive recording medium according to any one of <1> to <15> above, wherein in the laminating, the surface of the inlet provided with the convex-shaped electronic information recording element is line-contacted with the surface of the base sheet provided with the concave portion to thereby laminate the inlet with the base sheet.

<17> The method for producing a reversible thermosensitive recording medium according to any one of <1> to <16> above, wherein the vacuum suction roller and the lamination roller have a different surface hardness.

<18> The method for producing a reversible thermosensitive recording medium according to <17> above, wherein the lamination roller has a surface hardness of 20° to 50°.

<19> The method for producing a reversible thermosensitive recording medium according to any one of <1> to <18> above, wherein the lamination roller includes an elastic portion formed of an elastic material, and a metal portion formed of a metal.

<20> The method for producing a reversible thermosensitive recording medium according to any one of <1> to <19> above, wherein in the laminating, a nip pressure between the vacuum suction roller and the lamination roller, employed when the inlet is laminated with the base sheet, is 0.07 MPa to 0.3 MPa.

<21> The method for producing a reversible thermosensitive recording medium according to any one of <1> to <20> above, wherein in the laminating, the base sheet is allowed to enter a nip portion so that the base sheet has an inclined angle which is inclined toward the lamination roller side relative to a tangential direction in the nip portion when the inlet and the base sheet are laminated by the vacuum suction roller and the lamination roller.

<22> The method for producing a reversible thermosensitive recording medium according to <21> above, wherein the inclined angle is 10° to 30°.

<23> The method for producing a reversible thermosensitive recording medium according to one of <21> and <22> above, wherein in the laminating, the lamination roller is disposed at the conveying side of the base sheet in the conveying direction thereof relative to a surface of the vacuum suction roller which adsorbs the base sheet perpendicularly disposed downward as viewed from a central shaft of the vacuum suction roller.

<24> The method for producing a reversible thermosensitive recording medium according to any one of <1> to <23> above, further including:
removing inlets causing communication failure among the inlets.

<25> The method for producing a reversible thermosensitive recording medium according to any one of <1> to <24> above, further including:
cutting the base sheet onto which the inlets are laminated so that the base sheet includes the inlets.

a conveying unit configured to feed an inlet sheet which includes inlets each of which has a convex-shaped electronic information recording element and an antenna circuit on a circuit board, an inlet positional information-retrieving unit configured to retrieving positional information of the inlets by detecting the position of the inlets in the inlet sheet, an inlet sheet cutting unit configured to cut the inlet sheet into individual inlets based on the positional information of the inlet, a convex-shaped-electronic information-recording element-positional information retrieving unit configured to retrieve positional information of the convex-shaped electronic information recording element in the individual inlets on a vacuum suction roller which is rotatable with the individual cut-out inlets adsorbed on a surface of the inlet sheet, a base sheet conveying unit configured to feed a base sheet, which includes a reversible thermosensitive recording layer and a plurality of concave portions in a surface thereof opposite to a surface thereof on which the reversible thermosensitive recording layer is provided, toward the vacuum suction roller, a concave-portion positional information-retrieving unit configured to retrieve positional information of each of the concave portions by detecting the position of the concave portion in the inlet sheet, an aligning unit configured to align the convex-shaped electronic information recording element with the concave portion based on the positional information of the convex-shaped electronic information recording element and the positional information of the concave portion, so that the convex-shaped electronic information recording element is inserted into the concave portion, and a laminating unit configured to laminate the inlets and the base sheet by allowing the base sheet to pass between the vacuum suction roller and a lamination roller after the aligning.

<26> A production apparatus of a reversible thermosensitive recording medium, the production apparatus including:
a conveying unit configured to feed an inlet sheet which includes inlets each of which has a convex-shaped electronic information recording element and an antenna circuit on a circuit board, an inlet positional information-retrieving unit configured to retrieving positional information of the inlets by detecting the position of the inlets in the inlet sheet, an inlet sheet cutting unit configured to cut the inlet sheet into individual inlets based on the positional information of the inlet, a convex-shaped-electronic information-recording element-positional information retrieving unit configured to retrieve positional information of the convex-shaped electronic information recording element in the individual inlets on a vacuum suction roller which is rotatable with the individual cut-out inlets adsorbed on a surface of the inlet sheet, a base sheet conveying unit configured to feed a base sheet, which comprises a reversible thermosensitive recording layer and a plurality of concave portions in a surface thereof opposite to a surface thereof on which the reversible thermosensitive recording layer is provided, toward the vacuum suction roller, a concave-portion positional information-retrieving unit configured to retrieve positional information of each of the concave portions by detecting the position of the concave portion in the inlet sheet, an aligning unit configured to align the convex-shaped electronic information recording element with the concave portion based on the positional information of the convex-shaped electronic information recording element and the positional information of the concave portion, so that the convex-shaped electronic information recording element is inserted into the concave portion, and a laminating unit configured to laminate the inlets and the base sheet by allowing the base sheet to pass between the vacuum suction roller and a lamination roller after the aligning.

<27> A reversible thermosensitive recording medium obtained by the method for producing a reversible thermosensitive recording medium according to any one of <1> to <25> above.

The present invention can solve the above-mentioned conventional problems and achieve the above-mentioned object. That is, the present invention can provide a method for producing a reversible thermosensitive recording medium and a reversible thermosensitive recording medium production apparatus each of which enables aligning, with high precision, a convex-shaped electronic information recording element with a concave portion in which the convex-shaped electronic information recording element is housed, so that the recording element is laminated on a base sheet, preventing air bubbles from being included in the reversible thermosensitive recording medium to prevent recording failure and print failure caused by concave-convexes of a surface of the recording medium, continuously producing a reversible thermosensitive recording medium with high efficiency, and further producing reversible thermosensitive recording media having a variety of different sizes; and a reversible thermosensitive recording medium obtained by the method and apparatus.

Figure 1A:
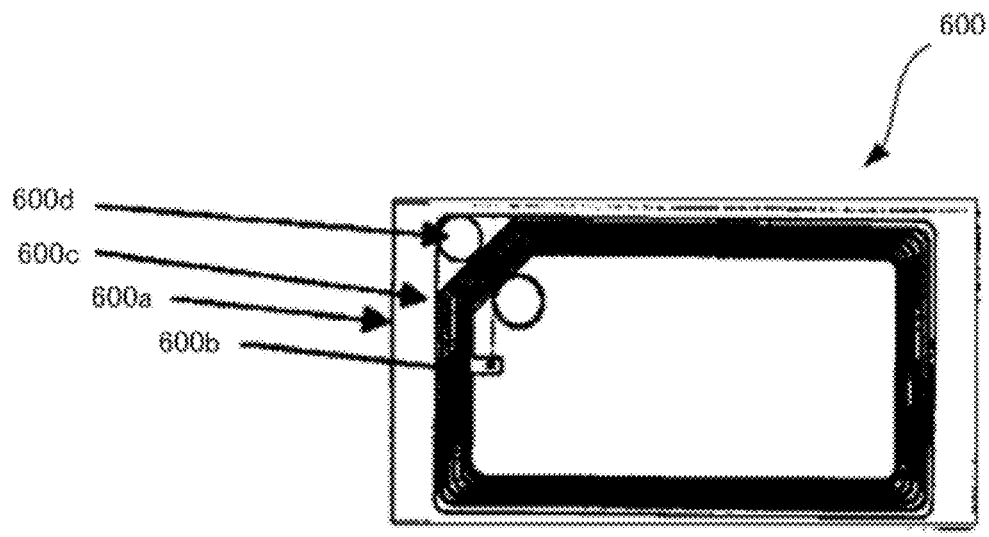
FIG. 1A is a schematic plan view illustrating one example of an inlet.

DETAILED DESCRIPTION OF THE INVENTION (Method for Producing Reversible Thermosensitive Recording Medium and Reversible Thermosensitive Recording Medium Production Apparatus)

A method for producing a reversible thermosensitive recording medium according to the present invention includes an inlet sheet conveying step, an inlet positional information retrieving step, an inlet cutting step, a convex-shaped-electronic-information-recording element positional information retrieving step, a base sheet conveying step, a concave portion positional information retrieving step, an aligning step, a laminating step, and when necessary, includes an inlet transferring step, a communication failed inlet removing step, and a base sheet cutting step.

A production apparatus of a reversible thermosensitive recording medium according to the present invention includes an inlet sheet conveying unit, an inlet positional information retrieving unit, an inlet cutting unit, a convex-shaped-electronic-information-recording element positional information retrieving unit, a base sheet conveying unit, a concave portion positional information retrieving unit, an aligning unit, a laminating unit, and when necessary, includes an inlet transferring unit, a communication failed inlet removing unit, and a base sheet cutting unit.

<Inlet Sheet Conveying Step and Inlet Sheet Conveying Unit>

The inlet sheet conveying step is a step of conveying an inlet sheet which includes inlets.

The inlet sheet conveying unit is a unit for conveying an inlet sheet which includes inlets.

The inlet sheet is not particularly limited, as long as it includes the inlets in plural numbers. For example, there may be exemplified an inlet sheet having a lengthy shape and including the inlets which are continuously disposed adjacent to each other in a longitudinal direction.

The inlet includes, on a circuit board, a convex-shaped electronic information recording element (which may be referred to as "IC portion" hereinbelow), an antenna circuit, further includes, a swage portion, and when necessary, includes other members.

The method of forming the antenna circuit is not particularly limited and may be suitably selected in accordance with the intended use. Examples of the method include a method of etching metal films stacked on the circuit board, a method of repeatedly rolling an electric wire (e.g., enamel wire) around the same surface of a base, a method of printing a so-called conductive paste on the circuit board, a method of embedding the antenna circuit in a base, and a method of laminating a metal foil serving as the antenna circuit.

The base for use in forming a circuit substrate is not particularly limited and may be suitably selected in accordance with the intended use. Examples of the base include rigid-type materials such as paper phenol, glass epoxy and composites; flexible-type materials such as polyimides, polyesters, polypropylenes, polyethylenes, polystyrenes, nylon, polyethylene terephthalate (PET), paper and synthetic paper; and complex-type materials of the rigid-type materials and the flexible-type materials.

The thickness of the base is not particularly limited and may be suitably selected in accordance with the intended use. It is, however, preferably 15 μm to 360 μm, and from the viewpoints that the reversible thermosensitive recording medium thin is made thin to improve the flexibility, a base having the electronic information recording medium which is lower in height allows the reversible thermosensitive recording medium to be thin, and a base having the circuit board and antenna circuit which are small in thickness enables making an adhesive layer for covering and coating the base thin and is excellent in processability and cost performance, it is more preferably 15 μm to 100 μm.

For example, when a metal foil serving as the antenna circuit is laminated on the base, the metal foil is not particularly limited, and a copper foil, an aluminum foil, an iron foil or the like may be used, for example. Among these, an aluminum foil is preferable for its excellence in costs and processability. The thickness thereof is preferably 6 μm to 50 μm.

The shape of the base is not particularly limited and may be suitably selected in accordance with the intended use. For example, a square, a rectangle, a circular shape, and an ellipse shape are exemplified.

The thickness (height) of the electronic information recording element is not particularly limited and may be suitably selected in accordance with the intended use. It is, however, preferably 200 μm or less, and more preferably 25 μm to 140 μm. In addition, to protect the electronic information recording element, a protective film such as a polyimide film, a polyester film, and paper can also be bonded on the electronic information recording element.

The thickness of the protective film is not particularly limited and may be suitably selected in accordance with the intended use. The thickness is preferably 10 μm to 60 μm, for example.

A commercially available product of the inlet sheet is not particularly limited and may be suitably selected in accordance with the intended use. For example, inlets sheets available from, for example, UPM, OMRON, Alien Technology Corporation, Sony Corporation, FUJITSU LIMITED, Hitachi, Ltd. Texas Instruments Incorporated, Fujii Corporation, Dai Nippon Printing Co., Ltd., and TOPPAN PRINTING CO., LTD. can be used.

Figure 1B:
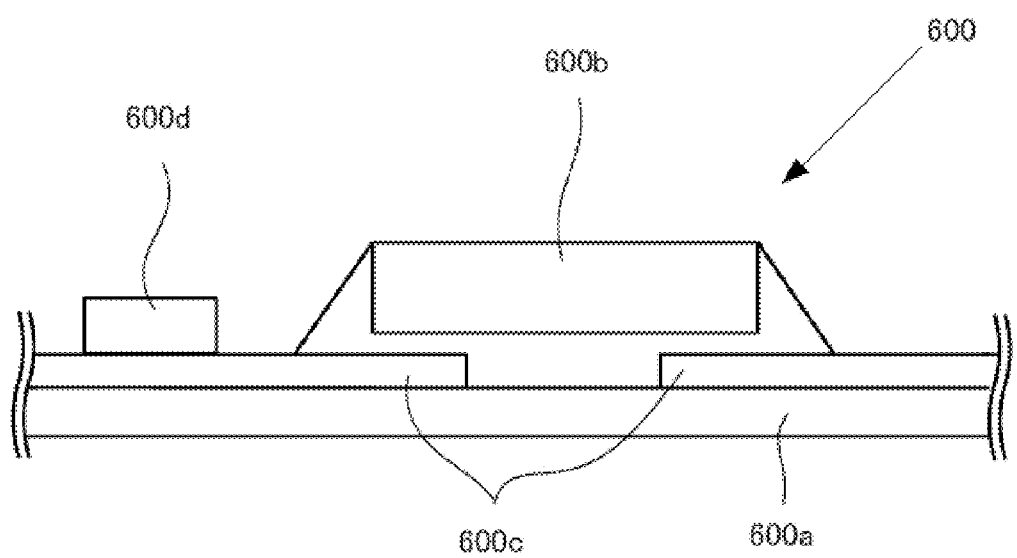
FIG. 1B is a schematic side view of the inlet illustrated in FIG. 1A.

Hereinbelow, the inlet will be described with reference to drawings. FIG. 1A is a schematic plan view illustrating one example of an inlet, and FIG. 1B is a schematic side view of the inlet illustrated in FIG. 1A.

In an inlet 600, a coiled antenna circuit 600c and a capacitative element are formed on a circuit board 600a (e.g., a plastic film) to form an LC resonance circuit, and thereby the inlet 600 can receive a radio wave having a constant frequency as well as transmit and sent back information of an electronic information recording element (IC chip) 600b to its transmission source.

As a communication frequency, generally, it is appropriately selected from frequency bands (e.g., 125 kHz, 13.56 MHz, 2.45 GHz, 5.8 GHz (microwave) and a UHF band) for use. Reference numeral 600d denotes a swage portion.

The inlet sheet conveying step is not particularly limited. The inlet sheet may be directly conveyed and transferred onto a vacuum suction roller. When the inlet sheet is cut into individual inlets before being transferred onto the vacuum suction roller, a cutting unit to cut the inlet sheet may also be conveyed to the vacuum suction roller.

In the inlet sheet conveying step, when the inlet sheet is transferred onto the vacuum suction roller, inlet positional information is retrieved on the vacuum suction roller in the inlet positional information retrieving step, and the inlet sheet is cut off on the vacuum suction roller in the inlet sheet cutting step. Such a series of steps that the inlet sheet is directly conveyed and transferred onto the vacuum suction roller to cut off the inlet sheet enables a continuous production with high efficiency.

The conveying unit of the inlet sheet is not particularly limited. Examples thereof include conventionally known conveying units such as a known inlet conveyance roller and a conveyance roller. However, preferred is a conveying unit in which the inlet sheet is sandwiched by two inlet sheet conveyance rollers, and which enables intermittent driving so that conveyance of the inlet sheet and stop the conveyance are repeatedly performed.

With use of such a conveying unit, after the inlet sheet is cut on the vacuum suction roller, the interval of respective inlets cut on the vacuum suction roller can be adjusted to a predetermined interval based on the intermittent driving. In other words, the timing of driving for stopping conveyance of the inlet sheet in the intermittent driving and the timing of switching the driving reversely can be set based on the interval between the adjacent inlets which are cut into respective inlets after the inlet cutting step.

The inlet sheet conveyance roller is not particularly limited and may be selected from known nip rollers (infeed rollers) and the like. For example, an inlet sheet conveyance roller of the two inlet conveyance rollers, which is to be bonded to a surface of the inlet sheet provided with a convex-shaped electronic information recording element, may have a concave portion in which the convex-shaped electronic information recording element is housed; and an inlet sheet conveyance roller of the two inlet conveyance rollers, which is to be bonded to a surface of the inlet sheet provided with a convex-shaped electronic information recording element, may have a groove having a shape corresponding to the shape of the convex-shaped electronic information recording element.

The transfer speed at which the inlet sheet is transferred is not particularly limited and may be suitably selected in accordance with the intended use. It is preferably 1 m/min to 20 m/min, and more preferably 2 m/min to 10 m/min.

When the transfer speed is lower than 1 m/min, the conveyance control (speed) easily varies. When the transfer speed is higher than 20 m/min, the precision of mounting of the inlet sheet onto the vacuum suction roller may degrade.

Note that the conveyance of the inlet sheet in the inlet sheet conveying step is not particularly limited. The inlet sheet that has not been cut may be directly mounted on the vacuum suction roller. In this aspect, when only inlets that have been cut are mounted on the vacuum suction roller by a transfer unit in the after-mentioned inlet transferring step, the transfer unit can also be conveyed together with the inlet sheet.

<Inlet Positional Information Retrieving Step and Inlet Positional Information Retrieving Unit>

In the inlet positional information retrieving step, the position of the inlet in the inlet sheet is detected to retrieve positional information of the inlet.

A detecting unit for detecting the position of the inlet in the inlet positional information retrieving step is not particularly limited. It is, however, preferably an inlet detection sensor configured to detect the lengths of respective inlets in the conveyance direction.

The inlet detection sensor is not particularly limited. Examples thereof include a laser sensor and CCD image sensor.

The inlet positional information retrieving step is not particularly limited. It is, however, preferable to use a unit capable of feed-back controlling driving of the two inlet sheet conveyance rollers in the inlet sheet conveying step, based on the detection result of the inlet. Examples of such a unit include a processor having a feed-back control circuit. Feed-back control of driving of the two inlet conveyance rollers can be performed based on the result of computation of the processor in which the detection result by the inlet detection sensor has been input.

By conducting the feed-back control, positioning of the inlet sheet can be adjusted with high precision when the inlet sheet is cut.

<Inlet Sheet Cutting Step and Inlet Sheet Cutting Unit>

In the inlet sheet cutting step, the inlet sheet is cut into individual inlets based on the inlet positional information.

The inlet sheet cutting unit is configured to cut the inlet sheet into individual inlets based on the inlet positional information.

The cutting unit for cutting the inlet sheet is not particularly limited and may be suitably selected in accordance with the intended use.

Examples of the cutting unit include a laser cutting device, a cutter using a shearing force (e.g., shearing cutter), and a rotary cutter. Among these, a laser cutting device which cuts the inlet sheet while scanning the moving inlet sheet with a laser beam is preferable.

The laser cutting device is preferably capable of varying a focal distance of a laser beam. With such a laser cutting device, the inlet sheet present in a curved shape on the vacuum suction roller can be cut with high precision without causing displacement.

When the inlet sheet is cut on the vacuum suction roller, the rotational speed of the vacuum suction roller (i.e., the transfer speed of the suction roller at the surface thereof absorbing the inlet sheet in the rotational direction) is not particularly limited and may be suitably selected in accordance with the intended use. The suction roller preferably rotates at the same speed as that of the inlet sheet. By conveying the inlet sheet at the same speed as the rotational speed of the vacuum suction roller, the inlet sheet can be efficiently cut without causing displacement.

Cutting by such a laser cutting device will be described with reference to drawings.

Figure 2A:
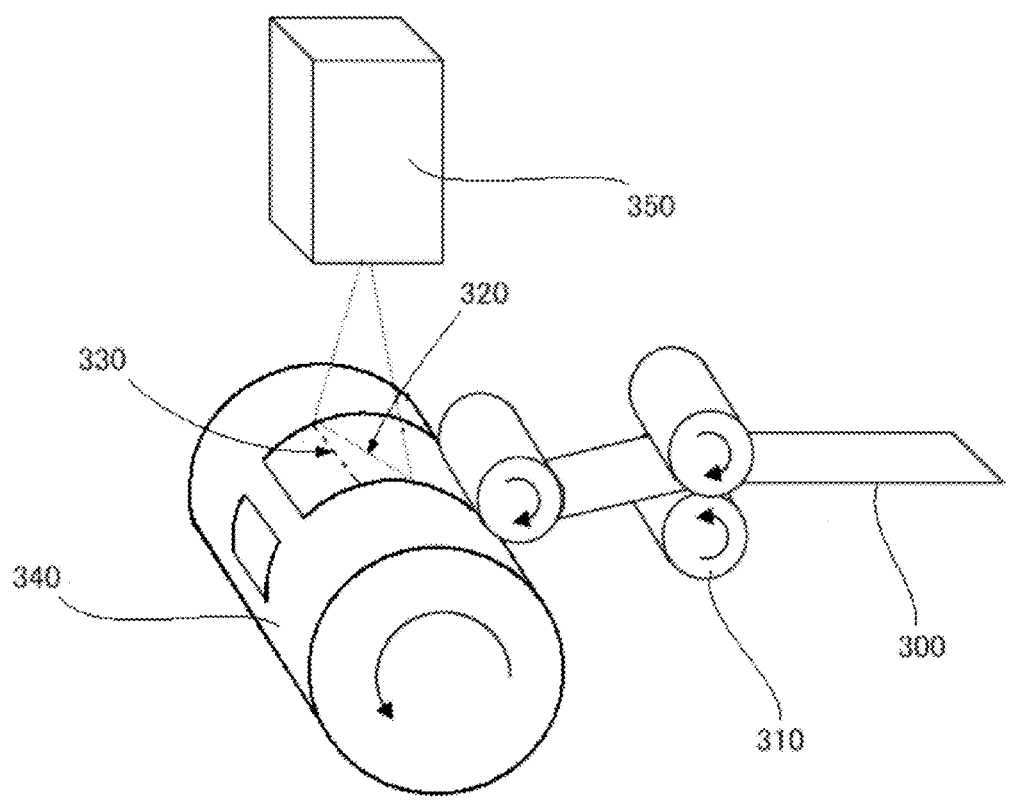
FIG. 2A is a perspective view illustrating one example of a cutting process by a laser cutter.

FIG. 2A is a perspective view illustrating one example of a cutting process by a laser cutting device. In a laser cutting device 350, an inlet sheet 300 which is moving on a vacuum suction roller 340 is cut while being irradiated with a laser beam.

The rotational speed of the vacuum suction roller 340 is input in the laser cutting device 350 by an encoder to automatically track the speed, and the inlet sheet is perpendicularly cut toward the direction of a scanning line 320.

By such a cutting method, the inlet sheet 300 can be cut so that the cut surface is aligned in a straight line (in the axial direction 330 of the vacuum suction roller 340)

Figure 2B:
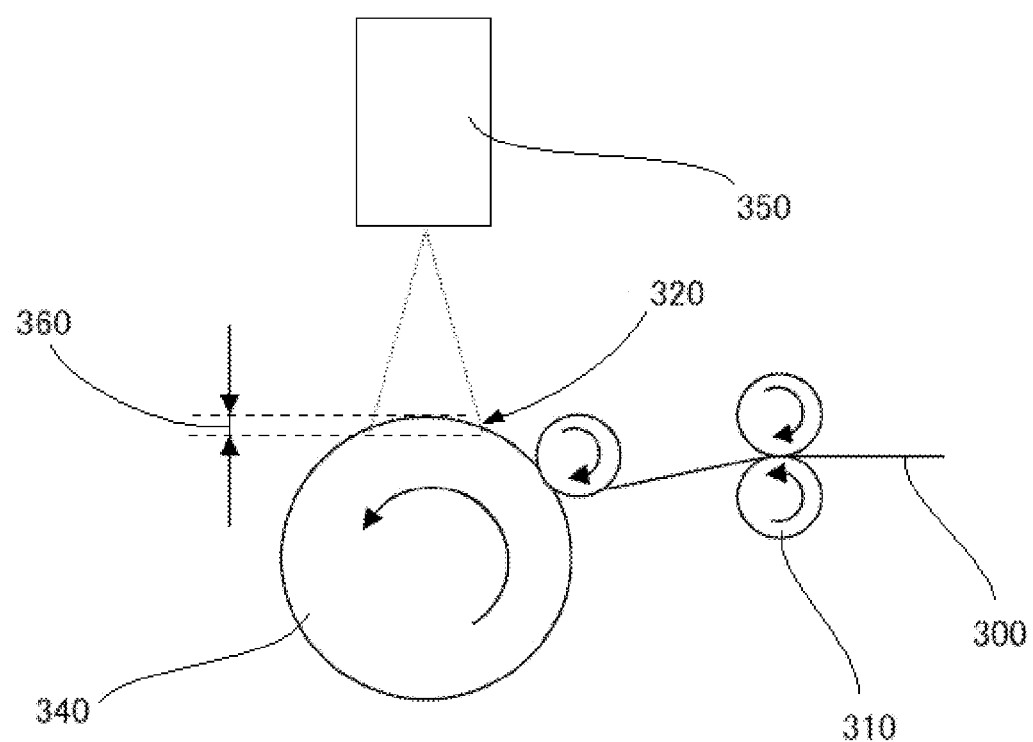
FIG. 2B is a view illustrating the cutting process by the laser cutting device in FIG. 2A.

FIG. 2B is a view illustrating the cutting process by the laser cutting device in FIG. 2A.

The inlet sheet 300 placed on the vacuum suction roller 340 has a curved surface.

The laser cutting device 350 can also be controlled to track the focal point of a laser beam in Z-axis direction, with respect to the curved surface of the inlet sheet, however, it is efficient to cut the inlet sheet within a focal distance width 360, without moving the Z axis up-and-down.

At this time, as described above, it is important to convey the inlet sheet 300 to the vacuum suction roller at the same speed as the transfer speed of the surface of the vacuum suction roller 340.

That is, if the continuous inlet sheet 300 is transversely cut by the laser cutting device 350 at 0.2 s, 0.1 s after starting cutting, the half of the cut portion of the inlet sheet 300 in the width direction thereof freely moves, but the left portion thereof is not cut and connected with the original inlet sheet. When the travel speed of the inlet sheet 300 is not the same as the rotation speed of the vacuum suction roller 340, for example, when the travel speed is late, the tensile force to the direction of the inlet sheet 300 acts at the portion remaining without being cut, the inlet which has been positioned is rotated on the vacuum suction roller 340, causing the displacement. Here, this state is referred to as a portion remaining without being cut.

<Inlet Transferring Step and Inlet Transfer Unit>

As described above, as one aspect of the production method, there may be exemplified a method in which the inlet sheet is directly transferred onto the vacuum suction roller in the inlet sheet conveying step, the inlet sheet is cut into individual inlets in the inlet sheet cutting step based on the inlet positional information retrieved in the inlet positional information retrieving step. As another aspect of the production method, there may be exemplified a method in which an inlet that has been cut is transferred onto the vacuum suction roller.

In this case, the production method preferably includes the following inlet transferring step.

In the inlet transferring step, the inlet that has been cut is transferred onto a vacuum suction roller by an inlet transfer unit.

Here, the method of obtaining the inlet(s) is not particularly limited. Preferred are the methods described in the inlet positional information retrieving step and the inlet sheet cutting step.

The inlet transfer unit is not particularly limited and may be suitably selected in accordance with the intended use. For example, a unit is preferable which has a stocking unit configured to stock inlets that have been cut, and a picking unit configured to pick up the stocked inlet and dispose the picked inlet on the vacuum suction roller at a predetermined timing.

The timing of disposing the picked inlet on the vacuum suction roller can be determined based on the timing at which the convex-shaped electronic information recording element and the concave portion are aligned for registration.

The stocking unit is not particularly limited, as long as it can house the inlets that have been cut. For example, a box-shaped contained is exemplified. From the viewpoint of production efficiency, a stocking unit is preferable which has an inlet-feed-out slit from which the stocked inlets can be continuously conveyed in connection with a conveyance roller for conveying the stocked inlets to the picking unit.

The picking unit is not particularly limited and may be suitably selected in accordance with the intended use. For example, there may be exemplified a picking unit having a standby unit in which the stocked inlets are on standby, a pick-up unit capable of detachably picking up the inlets, an arm unit which can drive the pick-up unit to move from the standby unit onto the vacuum suction roller, and a unit having a processor to control the movements of the pick-up unit and the arm unit. Detailed mechanisms of these units can be suitably selected from those in conventionally known transfer units.

<Convex-Shaped Electronic Information Recording Element Retrieving Step And Convex-Shaped Electronic Information Recording Element Retrieving Unit>

In the convex-shaped electronic information recording element retrieving step, the positional information of the convex-shaped electronic information recording element in the inlet on the rotatable vacuum suction roller is retrieved with the individual cut-out inlets being adsorbed on the surface of the vacuum suction roller.

The convex-shaped electronic information recording element retrieving unit is configured to retrieve the positional information of the convex-shaped electronic information recording element in the inlet on the rotatable vacuum suction roller with the individual cut-out inlets being adsorbed on the surface of the vacuum suction roller.

The inlet position detecting unit for detecting the position of inlets in the convex-shaped electronic information recording element positional information retrieving step is not particularly limited and may be suitably selected in accordance with the intended use. Preferred is a convex-portion detecting sensor for detecting a convex shape of an electronic information recording element.

The convex-portion detection sensor is not particularly limited and may be suitably selected in accordance with the intended use. Examples thereof include a CCD image sensor, and a two-dimensional image sensor, and a laser displacement gauge.

Further, the convex-portion detection sensor is not particularly limited, however, a convex-portion detection sensor is preferable which is configured to detect the position of a convex-shaped electronic information recording element in the convex-shaped electronic information recording element positional information retrieving step and to output positional information of the convex-shaped electronic information recording element including differential information between the position of the detected convex-shaped electronic information recording element and a reference position set by a size of the inlet or a pitch interval between the convex-shaped electronic information recording elements disposed adjacent to each other.

With use of such a convex-portion detection sensor, the positioning for correction in the aligning step can be carried out with high precision. The vacuum suction roller is not particularly limited, as long as it can rotate with the inlets absorbed on its surface. Examples thereof include vacuum suction rollers manufactured by Belmatic Co., and suction rollers manufactured by Kobayashi Seisakusho K.K.

The negative pressure applied to the inlet in the adsorption varies depending on the size of the inlet and is not unequivocally defined, but it is preferably −5 kPa to −10 kPa.

The material for forming the vacuum suction roller is not particularly limited, however, metal is preferred. The metal preferably has a surface hardness of Hy 180 or higher.

Examples of such a metal material include SUS304.

The roller diameter of the vacuum suction roller is not particularly limited, however, it is preferably 150 mm to 250 mm.

The positional information of the convex-shaped electronic information recording element is not particularly limited. For example, the positional information of the convex-shaped electronic information recording element is retrieved based on the detection of the position of the convex-shaped electronic information recording element in the inlet moving on the vacuum suction roller or an arbitrary position in the antenna circuit, by the detecting unit.

When the arbitral position of the antenna circuit is detected, the detection can be conducted by proving the portion with a marking part detectable by a detecting unit.

The method of forming such a marking portion is not particularly limited. For example, it can be formed by using a laser marker, an inkjet device or the like.

<Base Sheet Conveying Step and Base Sheet Conveying Unit>

In the base sheet conveying step, the base sheet having the reversible thermosensitive recording layer and a plurality of concave portions on a surface opposite to a surface on which the reversible thermosensitive recording layer is formed, is conveyed toward the vacuum suction roller. In the plurality of concave portions, the convex-shaped electronic information recording elements are inserted.

The base sheet conveying unit is configured to convey the base sheet having the reversible thermosensitive recording layer and a plurality of concave portions on a surface opposite to a surface on which the reversible thermosensitive recording layer is formed, is conveyed toward the vacuum suction roller. In the plurality of concave portions, the convex-shaped electronic information recording elements are inserted The base sheet is not particularly limited as to the shape, structure and size, as long as it has the concave portions, and may be suitably selected in accordance with the intended use. Examples of the shape include a film shape, and a sheet shape. Examples of plane shapes thereof include a square, and a circular shape. Examples of the structure include a single-layer structure, and a multi-layered structure. The size of the base sheet may be suitably selected in accordance with the intended use.

The base sheet is not particularly limited and may be suitably selected in accordance with the intended use. The base sheet may be, for example, a resin sheet, a rubber sheet, a synthetic paper, a metal sheet, a glass sheet or a composite thereof. Among them, a resin sheet is particularly preferred.

Examples of a material for forming the resin sheet include polyethylene terephthalate, polycarbonate, polystyrene, and polymethyl methacrylate. These may be used alone or in combination. Among them, polyethylene terephthalate is particularly preferred.

The base sheet may be appropriately synthesized or may be a commercially available product.

The thickness of the base sheet is selected in view of the depth of a concave portion formed in the base sheet, in which the convex-shaped electronic information recording element is inserted. The thickness is preferably 20 μm to 300 μm, and more preferably 50 μm to 188 μm.

When the thickness of the base sheet is less than 20 μm, it may be difficult to insert the convex-shaped electronic information recording element into the concave portion. When the thickness of the base sheet is more than 300 μm, the thickness of the reversible thermosensitive recording medium is increased, causing lack of flexibility, and it may be difficult to efficiently inserting plural stacked sheets of reversible thermosensitive recording media into a printer.

The method of forming the concave portion is not particularly limited and may be suitably selected in accordance with the intended use. Examples thereof include laser processing, and micro-mill processing.

The method of laminating the inlets and the base sheet is not particularly limited. For example, an adhesive material is applied to the inlets, and thereby the inlets can be laminated with the base sheet. However, from the viewpoint of production efficiency, it is preferable that an adhesive material be applied to the base sheet to thereby perform the lamination. That is, an adhesive is preferably applied to a surface of the base sheet provided with the concave portion.

At this stage, the adhesive material can be applied to the entire surface of the base sheet provided with the concave portion, however, the adhesive material is preferably selectively applied to a region including the surface of the base sheet provided with the concave portion. The region preferably corresponds to the size of inlets to be laminated with the base sheet.

An adhesive layer formed by coating the adhesive material is a layer for bonding the base sheet to the electronic information recording portions (inlets).

The adhesive material is not particularly limited and may be suitably selected in accordance with the intended use, is not particularly limited and may be suitably selected in accordance with the intended use. Examples of the adhesive material include urea resins, melamine resins, phenol resins, epoxy resins, vinyl acetate resins, vinyl acetate-acrylic copolymers, ethylene-vinyl acetate copolymers, acrylic resins, polyvinyl ether resins, vinyl chloride-vinyl acetate copolymers, polystyrene resins, polyester resins, polyurethane resins, polyamide resins, chlorinated polyolefin resins, polyvinyl butyral resins, acrylic acid ester copolymers, methacrylic acid ester copolymers, natural rubbers, synthetic rubbers, cyanoacrylate resins, silicone resins, styrene-isoprene-styrene block copolymers and EVA resins. Among them, preferred are natural rubbers, synthetic rubbers, acrylic resins, silicone resins, polyurethane resins, styrene-isoprene-styrene block copolymers and EVA resins, with acrylic resins being particularly preferable.

The thickness of the adhesive layer is not particularly limited. However, provided that when the adhesive layer has the same thickness as that from the bottom surface of the base of the electronic information recording portion to a plane of the antenna circuit (the thickness of an antenna portion) is +0 µm, the thickness of the adhesive layer is preferably +0 µm to +150 µm, more preferably +0 µm to +100 µm, and particularly preferably +0 µm to 60 µm. When the thickness of the adhesive layer is less than that of the antenna portion, the thickness uniformity of the resulting reversible thermosensitive recording medium is insufficient, and the printing quality degrades. With respect to the maximum value of the thickness, by way of an example, when the adhesive layer is formed to have a thickness exceeding +150 µm relative to 100 µm in thickness of the antenna portion so that the adhesive layer has a total thickness exceeding 250 µm, the adhesive layer is melted by heat pressure from a thermal head, and exudation may occur when printing or erasing is performed on the reversible thermosensitive recording medium using a heater.

The processing method of the adhesive layer is not particularly limited. Examples thereof include a processing method in which a composition solution containing the adhesive is applied to the base sheet, followed by heating to thereby bond the base sheet to the inlets.

In the case where the adhesive layer is subjected to the processing method, the adhesive material for use in the adhesive layer preferably has a viscosity of $1 \times 10^5$ cps or lower, provided that the processing temperature at the time of the coating and bonding is 90° C. or lower. Further, a material having a low viscosity of 24,000 cps or less is more preferred. That is, by making the coating temperature and viscosity of the adhesive layer low, it is possible to suppress the amount of curling in the resulting reversible thermosensitive recording medium, to rapidly lower the temperature of the adhesive layer to a temperature (about 60° C.) at which the reversible thermosensitive recording medium can be cut into a desired size in the subsequent cutting step, to thereby significantly improve the production efficiency.

Examples of the adhesive for forming such adhesive layer include a PUR-HM adhesive, perfect lock MR900RI (hereinafter, simply referred to as PUR) produced by Henkel Technologies Japan Ltd. The minimum value of the processing temperature is approximately 60° C., and minimum value of the viscosity is approximately $1 \times 10^5$ cps. When each of these values is higher than 60° C. and $1 \times 10^5$ cps, the adhesive layer may not be sufficiently formed.

In the case where the adhesive layer is formed as an exposed layer, an antistatic conductive filler is preferably contained in the adhesive layer. The antistatic conductive filler is contained so as to prevent double feed in a printer due to sticking, and improve processing of stacking tags. The antistatic conductive filler is not particularly limited, and examples thereof include an inorganic filler and an organic filler. Examples of the inorganic filler include carbonates, silicates, metal oxides and sulfuric acid compounds. Examples of the organic filler include silicone resins, cellulose resins, epoxy resins, nylon resins, phenol resins, polyurethane resins, urea resins, melamine resins, polyesters, polycarbonates, styrene resins, acrylic resins, polyethylenes, formaldehyde resins and polymethyl methacrylates.

The reversible thermosensitive recording layer reversibly changes in color tone and contains a reversible thermosensitive recording material reversibly changing in color depending on change in temperature. The reversible thermosensitive recording material changes in color as a result of changing in combination, for example, of light transmittance, light reflectance, light absorption wavelength and light scattering degree.

The reversible thermosensitive recording material is not particularly limited, as long as it can reversibly change in transparency or color tone by heat, and can be appropriately selected depending on the purpose. Examples of the reversible thermosensitive recording material include those which turn into a first color at a first temperature higher than ambient temperature and turn into a second color after heating at a second temperature higher than the first temperature and then cooling. The reversible thermosensitive recording material which turns into another color at first and second temperatures is particularly preferable.

Specific examples include a material which becomes transparent at a first temperature and becomes opaque at a second temperature (see JP-A No. 55-154198), a material which develops color at a second temperature and becomes colorless at a first temperature (see JP-A Nos. 04-224996, 04-247985 and 04-267190), a material which becomes opaque at a first temperature and becomes transparent at a second temperature (see JP-A No. 03-169590), and a material which turns into black, red, blue, etc. at a first temperature and becomes colorless at a second temperature (see JP-A Nos. 02-188293 and 02-188294). Particularly preferred are dispersions of an organic low-molecular-weight material (e.g., higher fatty acids) in a base resin; and mixtures of a leuco dye and a color developer.

The leuco dye is not particularly limited and can be appropriately selected depending on the purpose. Examples of the leuco dye include phthalide compounds, azaphthalide compounds and fluoran compounds. These may be used alone or in combination.

The color developer is not particularly limited and can be appropriately selected depending on the purpose. Examples of the color developer include those disclosed in, for example, JP-A Nos. 05-124360, 06-210954 and 10-95175. These may be used alone or in combination.

The color developer is a compound having, in the molecule thereof, at least one structure allowing a leuco dye to develop color (e.g., a phenolic hydroxyl group, carboxylic acid group and phosphoric acid group) and at least one structure controlling an intermolecular force (e.g., a structure containing a long chain hydrocarbon group). These structures may be linked to each other via a di- or higher polyvalent linking group containing a hetero atom. Also, the long chain hydrocarbon group may have such a linking group and/or an aromatic group.

Examples of such a color developer include those disclosed in, for example, JP-A Nos. 09-290563 and 11-188969. Among them, preferred is at least one compound selected from compounds represented by the following General Formulas (1) and (2). These color developers have much higher sensitivity than conventional color developers, and thus energy applied for image formation can be reduced by about 10% to about 30%. In this case, thermal decomposition of the color developer can be reduced, and less damage is given to the reversible thermosensitive recording medium and the surface thereof. As a result, durability after repetitive use does not degrade, maintaining excellent image quality.

General Formula (1)

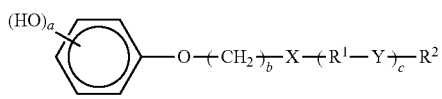

In General Formula (1), X and Y each represent a hetero atom-containing divalent organic group, $R^1$ represents a substituted or unsubstituted divalent hydrocarbon group, $R^2$ represents a substituted or unsubstituted monovalent hydrocarbon group, a is an integer of 1 to 3, b is an integer of 1 to 20, and c is an integer of 0 to 3.

General Formula (2)

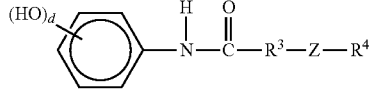

In General Formula (2), Z represents a hetero atom-containing divalent organic group, $R^3$ represents a substituted or unsubstituted divalent hydrocarbon group, $R^4$ represents a substituted or unsubstituted monovalent hydrocarbon group, and d is an integer of 1 to 3.

In General Formulas (1) and (2), as described above, each of X, Y and Z represents a hetero atom-containing divalent organic group, and particularly preferably represents a nitrogen or oxygen atom-containing divalent organic group; e.g., divalent organic groups containing at least one selected from the groups having the following structural formulas.

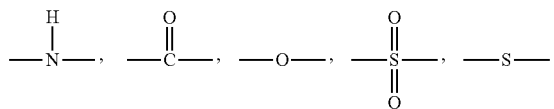

Preferred examples of the hetero atom-containing divalent organic group include those having the following structural formulas.

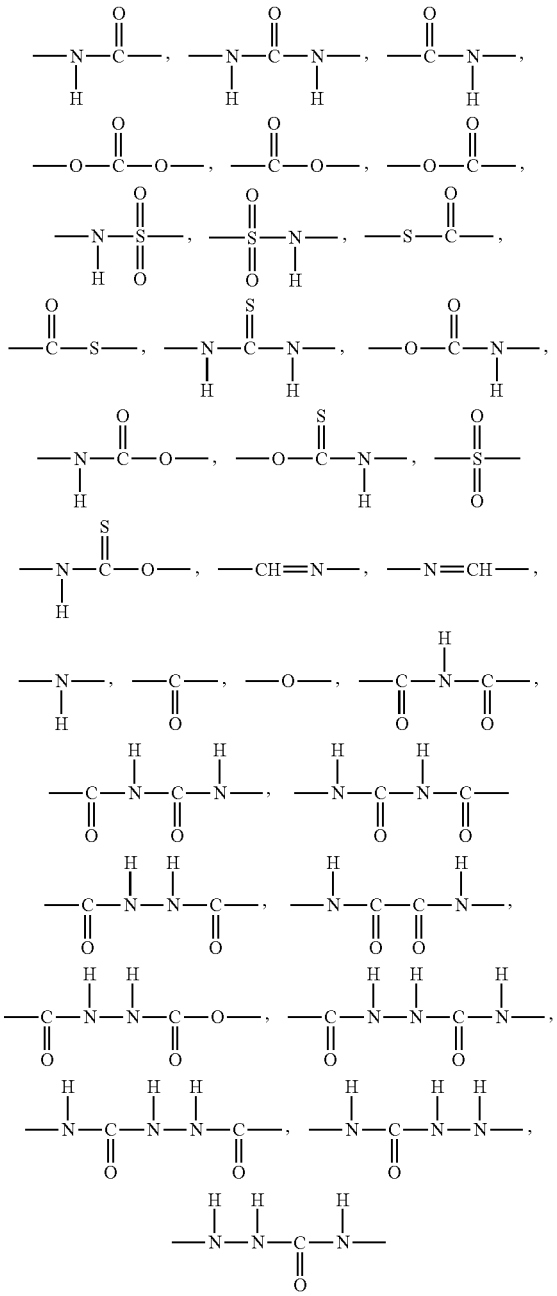

Of these, particularly preferred are those having the following structural formulas.

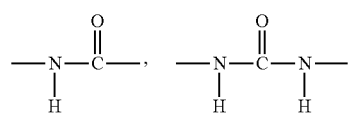

In General Formulas (1) and (2), $R^1$ and $R^3$ each represent a substituted or unsubstituted divalent hydrocarbon group having 1 to 20 carbon atoms.

Preferred groups represented by $R^1$ or $R^3$ are those represented by the following structural formulas:

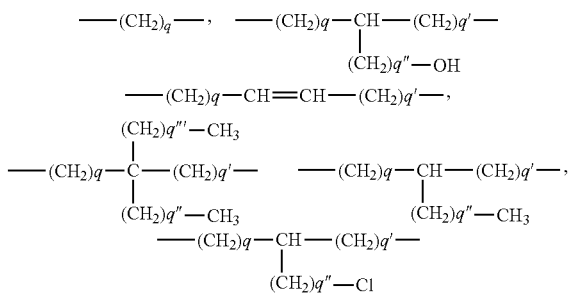

where each of q, q', q" and q'" is an integer satisfying the conditions: the total number of carbon atoms contained in the groups represented by $R^1$ or $R^3$ is 1 to 20. Among them, groups represented by —$(CH_2)_q$— are particularly preferred.

In General Formulas (1) and (2), $R^2$ and $R^4$ each represent a substituted or unsubstituted aliphatic hydrocarbon group having 1 to 24 carbon atoms, preferably 8 to 18 carbon atoms.

The aliphatic hydrocarbon group may be linear or branched, and may have an unsaturated bond. Examples of the substituent linked to the hydrocarbon group include a hydroxyl group, halogen atom and alkoxy group. When the total number of carbon atoms contained in groups $R^1$ and $R^2$ or groups $R^3$ and $R^4$ is 7 or less, stable color development or color erasure deteriorates. Thus, the total number is preferably 8 or more, more preferably 11 or more.

Preferred groups represented by $R^2$ or $R^4$ are those represented by the following structural formulas:

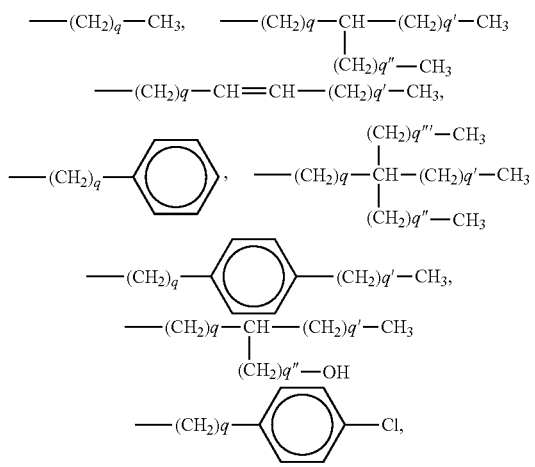

where each of q, q', q" and q'" is an integer satisfying the conditions: the total number of carbon atoms contained in the groups represented by $R^2$ or $R^4$ is 1 to 24. Among them, groups represented by —$(CH_2)_q$—$CH_3$ are particularly preferred.

If necessary, the reversible thermosensitive recording layer may contain an additive for improving and/or controlling coating property of a coating liquid therefor and color developability/erasability thereof. Examples of the additive include surfactants, conductivity-imparting agents, fillers, antioxidants, color development stabilizers and color erasure promoter.

The reversible thermosensitive recording layer preferably contains a leuco dye, a color developer and an additive together with a binder resin. The binder resin is not particularly limited, so long as it can bond the leuco dye, the color developer and the additive onto the first sheet-shaped base. Preferred examples of the binder resin include resins curable using heat, ultraviolet (UV) ray, electron beam (EB) for improving durability after repetitive use. Particularly preferred are thermally-curable resins using a curing agent. These resins can increase a gel ratio of the reversible thermosensitive recording layer.

The thermally-curable resin is not particularly limited and can be appropriately selected depending on the purpose. Examples of the thermally-curable resin include acryl polyol resins, polyester polyol resins, polyurethane polyol resins, polyvinyl butyral resins, cellulose acetate propionate and cellulose acetate butyrate.

The curing agent is not particularly limited and can be appropriately selected depending on the purpose. Preferably, isocyanates are used. Examples of the isocyanate include hexamethylene diisocyanate (HDI), tolylene diisocyanate (TDI), xylylene diisocyanate (XDI) and isophorone diisocyanate (IPDI); an adduct type, burette type, isocyanurate type formed between trimethylolpropane, etc. and the above isocyanates; and blocked products of the above isocyanates. Among them, preferred are hexamethylene diisocyanate, an adduct type thereof, a burette type thereof and an isocyanurate type thereof. Note that all the curing agent used do not participate in curing reaction. In other words, the reversible thermosensitive recording layer may contain an unreacted curing agent. Also, curing catalysts may be used for allowing curing reaction to successfully proceed.

The reversible thermosensitive recording layer preferably has a gel ratio of 30% or higher, more preferably 50% or higher, still more preferably 70% or higher. When the gel ratio is lower than 30%, the reversible thermosensitive recording layer may exhibit degraded durability after repetitive use.

Here, the gel ratio can be measured by immersing a coated film in a solvent having a high dissolution capability. Specifically, a reversible thermosensitive recording layer is peeled off from the first sheet-shaped base, followed by weighing (initial mass); and the thus-obtained reversible thermosensitive recording layer is sandwiched between 400-mesh wire gauzes and then immersed in a solvent capable of dissolving an uncured binder resin for 24 hours, followed by drying in vacuum and weighing (mass after drying). From the obtained values, the gel ratio can be calculated using the following Equation 1:

Gel ratio(%)=(mass after drying)/(initial mass)×100    <Equation 1>

Notably, the mass of components other than the binder resin (e.g., particles of organic low-molecular-weight materials), which are contained in the reversible thermosensitive recording layer, is not taken into account for calculation. When the mass of particles of organic low-molecular-weight materials is not previously obtained, it may be calculated from a mass ratio of the binder resin to the particles of organic low-molecular-weight materials. The mass ratio can be determined based on their specific gravities and a ratio of an area occupied with the binder resin to that occupied with the particles of organic low-molecular-weight materials by observing a unit area of the cross section of the layer through transmission electron microscopy (TEM), scanning electron microscopy (SEM), etc.

In the reversible thermosensitive recording layer, a mass ratio of the binder to a color developer is preferably 0.1 to 10. When the mass ratio is less than 0.1, the formed reversible thermosensitive recording layer has insufficient heat resistance; whereas when the mass ratio is more than 10, the density of color developed may decrease.

The reversible thermosensitive recording layer can be formed through application of a coating liquid prepared by homogeneously dispersing, in a solvent, a leuco dye, a color developer, an additive and a binder resin.

Examples of the solvent include alcohols, ketones, ethers, glycol ethers, esters, aromatic hydrocarbons and aliphatic hydrocarbons.

The coating liquid can be prepared using a disperser such as a paint shaker, a ball mill, an attriter, a three-roll mill, a Kady mill, a sand mill, a Dino mill or a colloid mill. Here, the coating liquid may be prepared by dispersing the above materials in a solvent using a disperser or may be mixing dispersions of the above materials one another. Also, these materials are dissolved in a solvent under heating and then the solution is rapidly or slowly cooled for precipitation.

Examples of coating methods for forming the reversible thermosensitive recording layer include blade coating, wire bar coating, spray coating, air knife coating, bead coating, curtain coating, gravure coating, kiss coating, reverse roll coating, dip coating or die coating.

The thickness of the reversible thermosensitive recording layer is not particularly limited and can be appropriately selected depending on the purpose. It is preferably 1 μm to 20 μm, more preferably 3 μm to 15 μm. When the thickness is less than 1 μm, the density of color developed may decrease to degrade the contrast of the formed image. Whereas when the thickness is more than 20 μm, position-dependent variation in the amount of heat applied becomes large in the reversible thermosensitive recording layer. Some portions of the recording layer do not develop color since the temperature of the portions does not reach a color developing temperature, potentially resulting in failure to attain a desired color density.

Note that the reversible thermosensitive recording layer is not particularly limited, may be provided on the base sheet before the lamination of the inlets with base sheet, or maybe provided on the base sheet after the lamination of the inlets with base sheet.

The conveying unit of the base sheet is not particularly limited and may be suitably selected in accordance with the intended use. Examples of the conveying unit include unreeling by a nip roll, and continuous conveyance by a roll-to-roll method.

The conveyance speed of the base sheet is not particularly limited and may be suitably selected in accordance with the intended use. It is preferably 1 m/min to 20 m/min, and more preferably 2 m/min to 10 m/min.

When the conveyance sped is lower than 1 m/min, the control of conveyance (speed) easily varies. Whereas, when it is higher than 20 m/min, it is difficult to control the conveyance, and the positioning precision in the subsequent step (lamination) may degrade.

<Concave Portion Positional Information Retrieving Step and Concave Portion Positional Information Retrieving Unit>

In the concave portion positional information retrieving step, the concave portion in the base sheet is detected to retrieve positional information of the concave portion.

The concave portion positional information retrieving unit is configured to configured to retrieve positional information of the inlets by detecting the position of the inlets in the inlet sheet, The unit for detecting the position of the concave portion is not particularly limited and may be suitably selected in accordance with the intended use. A concave portion detection sensor which can detect the position of the concave portion is preferable.

The concave portion detection sensor is not particularly limited and may be suitably selected in accordance with the intended use. For example, a laser sensor, a laser displacement gauge, and an image sensor are exemplified.

The concave portion detection sensor detects the concave portion or a register mark indicating the position of the base sheet, thereby enabling detecting the position of the concave portion.

Further, the concave portion detection sensor is preferably capable of outputting positional information of the concave portion which includes difference information between the position of the detected concave portion and a reference position of the concave portion set by a size of the base sheet or a pitch interval between the concave portions arranged adjacent to each other.

With use of such a concave portion detection sensor, the positioning for correction (registration) in the aligning step of the concave portion and the convex-shaped electronic information recording element can be performed with high precision using the difference information.

Note that when the positional information of the concave portion is detected based on the detection of the register mark, the shape of the register mark is not particularly limited and may be suitably selected according to properties of the concave portion detection sensor. From the viewpoint of detectability, the register mark preferably has a concave shape.

The number of the register marks to be formed preferably corresponds to the number of concave portions formed in the base sheet. As the position at which the register marks are formed, they are preferably formed on a surface of the base sheet opposite to a surface thereof in which the concave portions are formed.

The method of forming the register marks in the base sheet is not particularly limited and may be suitably selected in accordance with the intended use. Examples thereof include a laser processor, and an inkjet printer. Among these, with use of a laser processor, clear marking in black is enabled by laser marking a surface of the base sheet provided with a reversible thermosensitive recording layer, which is opposite to a surface thereof in which the concave portions are formed.

<Aligning Step and Aligning Unit>

In the aligning step, aligning is performed so that the convex-shaped electronic information recording element is inserted in the concave portion based on positional information of the convex-shaped electronic information recording element and positional information of the concave portion.

The aligning unit is configured to align the convex-shaped electronic information recording element with the concave portion based on the positional information of the convex-shaped electronic information recording element and the positional information of the concave portion, so that the convex-shaped electronic information recording element is inserted into the concave portion.

By such a high-precision aligning (registration), the concave portion can be formed small suited to the size of the convex-shaped electronic information recording element. In addition, based on the high-precision aligning, it is possible to reduce a void between the concave portion and the convex-shaped electronic information recording element and to prevent occurrence of concave-convexes in the surface of the reversible thermosensitive recording medium, in the periphery of the convex-shaped electronic information recording element. Also, the engagement of the concave portion with the convex-shaped electronic information recording element is tightened to reduce the use amount of an adhesive material, thereby the color nonuniformity of the reversible thermosensitive recording layer attributable to a difference in coefficient of thermal conductivity therebetween can be reduced, and the print quality can be improved.

The method of aligning the concave portion with the convex-shaped electronic information recording element is not particularly limited and may be suitably selected in accordance with the intended use. Examples thereof include a method of adjusting the rotation drive of the vacuum suction roller, and a method of adjusting the transfer speed of the base sheet.

In the aligning, there is no particular limitation, however, it is preferable that the positional correction be performed based on the positional information of the convex-shaped electronic information recording element and the positional information of the concave portion. More preferably, the positional of the convex-shaped electronic information recording element is corrected while controlling the rotation drive of at least the vacuum suction roller. That is, it is preferable that the position of the inlet be corrected by adjusting the transfer speed of the base sheet and controlling the rotation drive of the vacuum suction roller.

At this time, as the positional correction, it is preferable to correct positions of pulses so that a pulse signal generated from the positional information of the convex-shaped electronic information recording element is synchronized with a pulse signal generated from the positional information of the concave portion.

The method for correcting the pulse positions is not particularly limited. For example, there is a method in which the transfer speed of the base sheet is set as a reference, the amount of displacement of the inlet sheet from its reference position is compared with the amount of displacement of the base sheet from its reference position, and the pulse positions are increased or decreased for the amount of correction by driving of the vacuum suction roller.

With such a registration (aligning), the positioning of the convex-shaped electronic information recording element and the concave portion can be performed with high precision in the lamination step. In addition, examples of the aligning method include a method of feed-back controlling the rotation drive of the vacuum suction roller based on a result obtained by comparing a distance of the convex-shaped electronic information recording element to a lamination position with a distance of the concave portion to the lamination position based on the positional information of the convex-shaped electronic information recording element and the positional information of the concave portion.

Note that when the positional correction is performed on the rotation drive of the vacuum suction roller, it is preferable to control driving corresponding to the positional correction, with respect to conveyance of the inlet sheet in the inlet sheet conveying step or mounting inlets in the inlet transferring step. Through such driving control, it is possible to prevent occurrence of displacement when the inlet sheet or the inlet is transferred to and mounted on the vacuum suction roller.

<Laminating Step and Laminating Unit>

In the lamination step, the base sheet is passed through between the vacuum suction roller and a lamination roller to laminate the inlet with the convex-shaped electronic information recording element, based on the aligning (registration).

The laminating unit is configured to pass the base sheet through between the vacuum suction roller and a lamination roller to laminate the inlet with the convex-shaped electronic information recording element, based on the aligning (registration).

By performing such a lamination, it is possible to prevent inclusion of bubbles between the inlet and the base sheet, to reduce concave-convexes in the surface of the reversible thermosensitive recording medium and to improve the print quality.

In the lamination, the inlet is preferably laminated with the convex-shaped electronic information recording element, with a surface of the inlet provided with the convex-shaped electronic information recording element (inlet lamination surface) being in a line contact with a surface of the base sheet provided with the concave portion (base sheet lamination surface). Specifically, when the inlet lamination surface of the inlet to be absorbed by the vacuum suction roller is laminated with the base sheet lamination surface, lamination is started with the edge of the inlet lamination surface on the rotation direction side of the vacuum suction roller being in a line contact with the base sheet lamination surface, and from this state, the lamination is performed so that the inlet lamination surface is laminated in an area contact with the base sheet lamination surface. More specifically, when the inlet lamination surface of the inlet to be adsorbed by the vacuum suction roller is laminated to the base sheet lamination surface, lamination is started with the edge of the inlet lamination surface on the rotation direction side of the vacuum suction roller being in a line contact with the base sheet lamination surface, and from this state, the lamination is performed so that the inlet lamination surface is laminated in an area contact with the base sheet lamination surface.

By performing such a lamination, it is possible to remove air bubbles between the inlet and the base sheet.

The vacuum suction roller and the lamination roller for use in lamination of the inlet with the base sheet preferably have a different surface hardness. With such rollers, the lamination can be performed while strongly pressing air bubbles generated between the inlet and the base sheet.

Specifically, the vacuum suction roller is preferably formed of a metal material having a high surface hardness, and the lamination roller is preferably formed of an elastic material (e.g., rubber) having a low surface hardness.

In addition, it is also possible to use a roller formed of an elastic material (e.g., rubber) and a roller with only a portion to which a countersunk hole portion of the rubber roller is contacted is made of metal, in terms that it is possible to prevent occurrence of print failure at a reversible thermosensitive recording layer. Because, when the inlet is laminated with a roll made of rubber at its front surface in a width direction thereof, a countersunk hole portion of the base sheet is pressed and deformed due to elastic deformation of the roll, and such print failure may occur.

The surface hardness of the lamination roller is not particularly limited, as long as it is lower than that of the vacuum suction roller. It is preferably 20° to 50°, and more preferably 20° to 40°.

When the surface hardness of the lamination roller is less than 20°, air bubbles may include due to insufficient pressure in the lamination. When the surface hardness of the lamination roller is more than 50°, air bubbles are not sufficiently expelled in the lamination, causing inclusion of air bubbles in the periphery of an antenna in the inlet sheet.

Examples of the method of measuring a surface hardness of the vacuum suction roller and the lamination roller include a Vickers' hardness tester, and a rubber hardness tester.

The vacuum suction roller and the lamination roller nip the inlet and the base sheet. A nip pressure in a nip portion at which both of the rollers are closely contact is preferably 0.07 MPa to 0.3 MPa, and more preferably 0.25 MPa to 0.3 MPa.

When the nip pressure is less than 0.07 MPa, air bubbles may be included due to insufficient pressure in lamination.

When the nip pressure is more than 0.3 MPa, wrinkle easily occur due to the excessive pressure.

The aspect of conveyance of the base sheet in the lamination is not particularly limited. When the inlet is laminated with the base sheet using the vacuum suction roller and the lamination roller, the base sheet can be made proceed into the nip portion at an angle equal to the tangent line in the nip portion. It is preferable that the base sheet be allowed to enter the nip portion so that the base sheet has an inclined angle which is inclined toward the lamination roller side relative to a tangential direction in the nip portion when the inlet and the base sheet are laminated by the vacuum suction roller and the lamination roller.

According to such a conveyance aspect, the base sheet lamination surface of the base sheet can be made proceed at a deep angle to the inlet lamination surface, and thus it is possible to easily prevent air bubbles from being included in between the inlet and the base sheet.

The inclined angle is not particularly limited and may be suitably selected in accordance with the intended use. It is preferably 10° to 20°.

Note that the tangential direction in the nip portion means the same direction as the tangential direction of the absorption surface of the vacuum suction roller and the surface of the lamination roller.

The arrangement of the lamination roller to the vacuum suction roller is not particularly limited, and it may be disposed at a position corresponding to the adsorption surface of the vacuum suction roller which is perpendicularly positioned downward as viewed from the center shaft of the vacuum suction roller. However, it is preferable to dispose the lamination roller so as to be positioned on the sheet supplying side in the conveyance direction relative to the adsorption surface serving as a reference.

As the position of the nip portion, the nip portion is preferably placed at a position the rotation of the vacuum suction roller is turned back with an angle of 20° to 40° in a direction opposite to the rotational direction of the vacuum suction roller, with reference to the case where the nip portion is perpendicularly placed downward as viewed from the center shaft of the vacuum suction roller.

With such an arrangement of rollers, the lamination surface of the base sheet can be made proceed to the inlet lamination surface at a deep angle, and thus inclusion of air bubbles between the inlet and the base sheet can be easily prevented.
<Communication Failure Removing Step and Communication Failure Removing Unit>

In the communication failure removing step, among the inlets, inlets causing communication failure are removed.

A detecting unit of the inlets causing communication failure in the communication failure removing step is not particularly limited. Examples thereof include a testing method using an IC chip reader/writer communication device.

The timing at which the detection is performed is not particularly limited, and the detection may be performed relative to the inlet sheet before it is cut into the inlets, or may be performed the inlets that have been cut into individual inlet pieces.

The method of removing the inlets causing communication failure is not particularly limited and may be suitably selected in accordance with the intended use. For example, a method of removing failed products by a vacuum force of the vacuum roller on which the inlet sheet is placed. The timing at which the removal is performed is not particularly limited and may be suitably selected in accordance with the intended use. It is, however, the removal is preferably performed before the lamination. By removing the inlets causing communication failure at this timing, it is possible to avoid extra lamination and to reduce the production costs. <Base sheet cutting step and Base sheet cutting unit>

In the base sheet cutting step, the base sheet to which surface the inlets are bonded is cut so as to include the inlets.

The unit to cut the inlet sheet is not particularly limited and may be suitably selected in accordance with the intended use. For example, punching through a punching device is exemplified.

The timing at which the cutting is performed is not particularly limited and may be suitably selected in accordance with the intended use. The cutting is, however, preferably performed after the adhesive is solidified.

The timing of the detection is not particularly limited and may be suitably selected in accordance with the intended use. For example, there may be exemplified a method, in which after lamination, a relationship between the temperature of a tag and the time spent until the adhesive is solidified (by cooling) is grasped, and the production line is desired so that the time can be secured from the lamination step to the cutting step.

Figure 3:
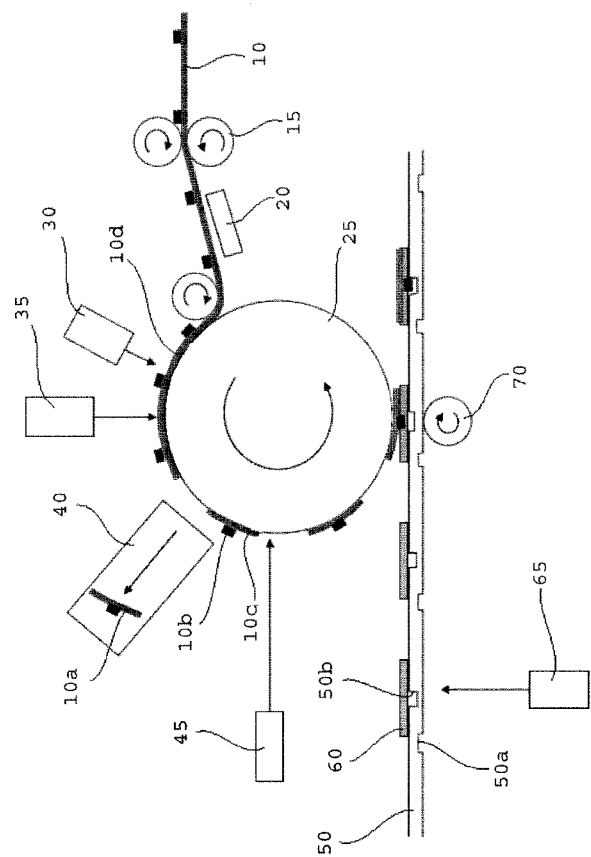
FIG. 3 is a view illustrating the outline of a production process of a reversible thermosensitive recording medium according to a first embodiment.
Figure 4:
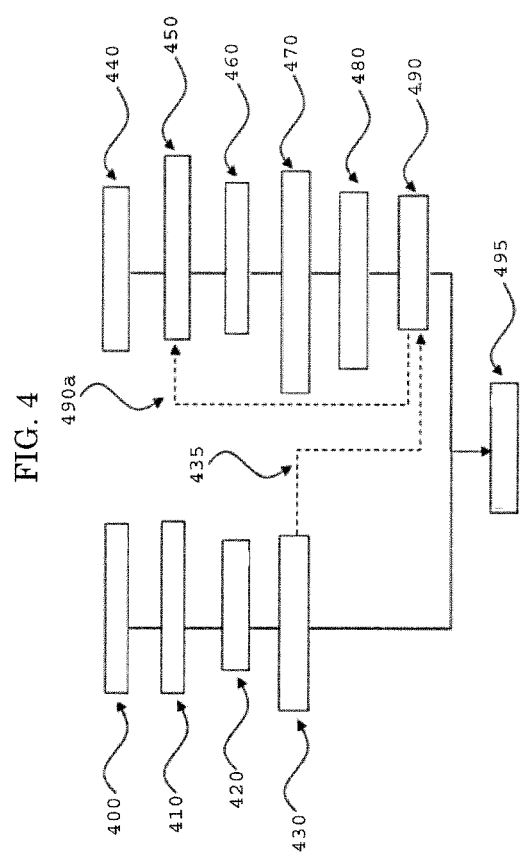
FIG. 4 is a view illustrating a flow chart of the production process according to the first embodiment.
Figure 5:
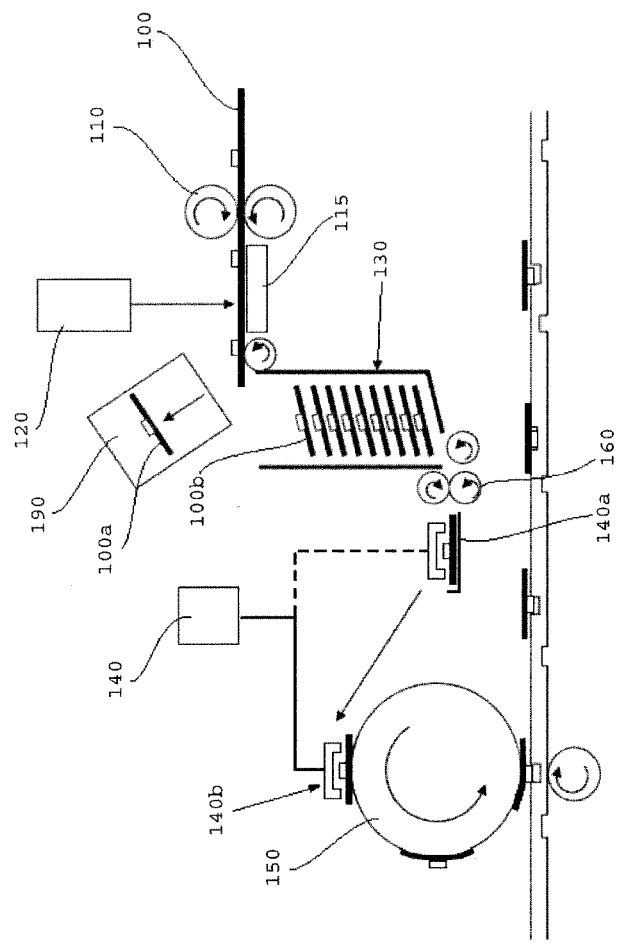
FIG. 5 is a view illustrating the outline of a production process of a reversible thermosensitive recording medium according to a second embodiment.

Hereinafter, preferred embodiments of the method for producing a reversible thermosensitive recording medium of the present invention will be described with reference to FIGS. 3 to 5. FIG. 3 is a view illustrating the outline of a production process of a reversible thermosensitive recording medium according to a first embodiment. FIG. 4 is a view illustrating a flow chart of the production process according to the first embodiment. FIG. 5 is a view illustrating the outline of a production process of a reversible thermosensitive recording medium according to a second embodiment.

First Embodiment

In FIG. 3, an inlet sheet 10 (produced by Hitachi Ltd., HIBIKI, HE-MU384-I002E) is straightly conveyed onto a rotating cylindrical-shaped vacuum suction roller 25 by infeed rollers 15 (nip roller), so as to mount an inlet. Here, the adsorption of the vacuum suction roller 25 is always turned on, and when the inlet sheet 10 is straightly conveyed thereon, the vacuum suction roller 25 starts adsorbing.

Just before the absorption, register mark 10d (or an IC portion) on the inlet is detected by an inlet position detecting sensor 30, and then the inlet sheet 10 is conveyed only at a certain distance by the driving of the infeed rollers 15 so as to locate in a position at a certain angle of the vacuum suction roller 25 based on the result of detection.

At this time, the inlet sheet 10 is conveyed by the infeed rollers 15 at the same speed as that of the vacuum suction roller 25 according to the travel of the inlet position by the rotation of the vacuum suction roller 25 so as to eliminate the tension from the infeed side (infeed rollers 15 side) to the inlet, to thereby prevent displacement of the inlet position.

In addition, in the midway of the transfer from the infeed roller 15 to the vacuum suction roller 25, the communication facility of the inlet is tested by a communication testing device 20, and the test result is recognized by an unillustrated control section so that a failed inlet can be rejected in a subsequent step.

Next, in order to cut the inlet sheet 10 into a plurality of sheets during rotating and traveling of the inlet sheet 10, the inlet sheet 10 is straightly scanned at high speed with a laser cutting device 35 so as to cut the inlet sheet 10 into strips of paper. The inlet sheet 10 on the curved surface of the vacuum suction roller 25 is cut into an inlet 10c on the vacuum suction roller 25.

Owing to the mechanism of the sheet feeder, a portion remaining without being cut does not occur during cutting.

In the inlet 10a which has been cut without any displacement, inlets determined as "failed" by the communication testing device 20 are removed by a rejection device 40.

With respect to inlets detected as having no communication failure in the communication test, the position of an IC portion 10b in the inlet 10C is detected by a position detecting sensor 45 for IC portion.

Concurrently with the testing, a concave portion 50b is formed in a base material (produced by TOYOBO Co., Ltd., K2323, polyester film) which can be conveyed below the vacuum suction roller 25, and an adhesive 60 (produced by Henkel Technologies Japan Ltd., MR900RI, which may be referred to as PUR, simply) is applied to an area including the concave portion 50b in a base sheet 50. The position of the concave portion 50b or a register mark 50a in the base sheet 50 corresponding to the concave portion 50b is detected by a position detection sensor 65 for detecting the position of concave portions.

With this, the positional information of the IC portion 10b and the concave portion 50b can be determined before lamination.

When there is a positional difference between the IC portion 10b and the concave portion 50b, the vacuum suction roller 25 is allowed to rotate for correction by the positional difference.

In this case, new inlets to be mount on the vacuum suction roller 25 in the corrective rotation of the position of the IC portion 10b is mounted thereon while adjusting a pulse positively or negatively by the positional correction so as not to disturb the conditions for mounting it to the position at the certain angle of the vacuum suction roller 25.

The base sheet 50 is pressed against the inlet 10c whose position has been corrected toward the vacuum suction roller 25 side using a rubber-made lamination roller 70 so as to be pressed and laminated between the vacuum suction roller 25 and the lamination roller 70.

At this time, an end of the surface the vacuum suction roller 25 in the rotational direction thereof to which the inlet 10c is laminated is applied to the adhesive 60 on the base material (base sheet) 50, and the IC portion 10b is inserted into the concave portion 50b with high precision while the end of the vacuum suction roller 25 being slowly pressed against the adhesive 60 in this state so as to expel air bubbles therefrom to thereby laminate the inlet 10c with the base sheet 50.

Here, the configuration for preventing the displacement in the width direction between the base sheet 50 and the inlet 10c will be described below. Firstly, the configuration for preventing displacement concerning the base sheet 50 from the following standpoints of 1 to 5 will be described below.

1. Making Basic Conveyance Accurate:

Correction of a horizontal degree of a conveyance roller (not illustrated) for conveying the base sheet /S lap passage, and roughing surface of the roller for providing a grip for preventing displacement in a width direction will be carried out. By these, the base sheet 50 is rolled out straight from the base sheet conveyance roller, preventing from being meandered.

"S lap" means a sheet passage through two rollers in the shape of "S" (if there are two rollers both having the same height, the base sheet 50 is passed through from the top of the first roller to the bottom of the second roller). By this sheet passage, a grip force is generated against the base sheet conveyance roller when a tension is applied to the base sheet 50. Moreover, a grip force is also generated by simply roughing a surface of the base sheet conveyance roller. These prevent displacement in the width direction or meandered conveyance.

2. High Speed Tracking:

Prevention of sagging of the base sheet 50 or meandered conveyance due to variation in tension is carried out by a tension-pick control.

The reduced tension makes the base sheet 50 free, easily causing a displacement in a width direction of the base sheet 50. Therefore, a width direction of the base sheet 50 and straight conveyance thereof are stably maintained by tension-pick control (tension sensor control) that reacts with a minute movement of the base sheet 50. Therefore, a function to absorb the sagging of tension is provided to a production apparatus using a dancer roller, but strictly, a mechanical loss exists in the operation to rotate the dancer roller, causing a minutely slow response speed of the overall control, causing a variation in control, and consequently leading to displacement in the width direction and meandered conveyance.

However, in the present embodiment, it can be considered that rapid sagging of tension hardly occurs because the line speed is within a low speed range and a servo motor having high accuracy is used in each driving units for conveyance, and thus by using tension pick control which quickly reacts with the behavior of the base sheet 50, without using any dancer rollers, positioning in the width direction of the base sheet 50 the straight movement thereof are maintained without causing sagging of tension of the base sheet 50; the base sheet 50 is passed through between rollers in the shape of S. Rollers having a roughed surface are used, and the base sheet 50 is passed through between the rollers to thereby imparting a grip force resistant to transverse displacement.

3. Fundamentally reducing occurrences of displacement by setting the distance between the place where a laser counter-boring step is performed and the place where an attaching step is performed, as short as possible, such as within 1 m.

In the conveyance of the base sheet, from the feed-out portion to the attachment step, there are provided a step of forming concave portions and a step of applying an adhesive for affixing the inlet sheet to the base sheet. The longer the length of conveyance in these steps, the larger the cause of displacement in the width direction of the base sheet becomes, simply. Therefore, the amount of displacement in the width direction is reduced by designing the length of these steps to be shortened to the extent possible.

4. Preventing Displacement in Width Direction by a Guide Rail or Ring for Positioning In the conveyance from the concave processing step to the attachment step, basically, it is possible to provide straight conveyance of a base sheet by arranging respective conveyance rollers in parallel. However, as a countermeasure for further preventing displacement in the width direction, the width direction of the base sheet 50 is registered by a guide rail for positioning the conveyance direction of the base sheet 50 in a reference width of the product or a positioning ring disposed on a base sheet conveyance roller to thereby prevent displacement in the width direction.

5. Preventing Displacement in Width Direction by Increasing Rigidity of Base Sheet To increase the correction ability of the guide rail and the positioning ring in the width direction, the thicker the base sheet, the more advantageous. When the thickness of the base sheet is small, the base sheet whose positioning in width direction is to be corrected is in contact with the guide rail and/or positioning ring and is easily distorted, and the correction in the width direction may not be achieved. For example, the effect of the guide rail for positioning is increased by using a thick base having a rigidness, such as those having a thickness of 188 μm to 250 μm as the base sheet 50.

Next, the displacement from the standpoint of the inlet 10b will be described.

1. Making Basic Conveyance Accurate:

Correction of the horizontal degree in an inlet conveyance roller (not illustrated)/S lap passage, and roughing surface of the roller for providing a grip for preventing displacement in the width direction will be carried out.

Likewise the case of the base sheet 50, by these, an inlet sheet 10 is rolled out straight from an inlet conveyance roller, preventing from being meandered.

Positional displacement between the concave portion 50b and the IC portion 10b in traversing direction and the width direction will be prevented using the configurations in each of the above items.

As to positional displacement in the traveling direction and width direction which could not be prevented, the amount of displacement in XY direction (the longitudinal direction and width direction of the base sheet) is determined by using a CCD camera set at the position that is located downstream of the area where the inlet 10c and the base sheet 50 are laminated, and then corrected.

The correction of this XY displacement can be easily performed by precisely adjusting based on transferred automatic feed back of XY displacement value by a laser mark positioning program of the laser cutting device 35.

By highly accurately positioning in the aforementioned manner, the space in the width direction between the IC portion 10b to be inserted and the concave portion 50b can be positioned and the IC portion 10b can be inserted without any problem, even when the concave portion 50b is small in size such that it is bigger than the IC portion 10b only by 1.0 mm to 1.5 mm both in length and width directions.

Moreover, as the concave portion 50b is formed by a laser processing or micro-mill processing, the depth of the concave portion 50b can be arbitrarily adjusted only by controlling the setting condition. By this, the difference between the height of the IC portion 10b to be inserted into the concave portion 50b and the depth of the concave portion 50b (the space between the concave portion 50b and the I C portion 10b in the depth direction of the concave portion 50b) can be set 0 μm to 50 μm, preferably 0 μm to 20 μm.

Further, more detailed high-precision positioning based on positional correction and feed-back control in the production process according to the first embodiment will be described.

In the present production process, the conveyance of the base sheet 50 is used as a reference, and positional correction in conveyance of an inlet is controlled with respect to the reference.

In FIG. 4, the operation process of the base sheet 50 proceeds through, from a base material conveying step 400, a register mark processing step 410, a concave portion processing step 420 and a concave portion position detecting step 430, to a laminating step 495. In the present production process, by forming a concave portion 50b in reference to a registration mark 50a, the positional relationship of the register mark 50a and the concave portion 50b is set constant.

Subsequently, by detecting the register mark 50a in the concave portion position detecting step 430, the distance between the position of the concave portion 50b and the position of the base sheet where an IC portion 10b is inserted into the concave portion 50b is detected.

Meanwhile, an inlet 10c proceeds through, from an inlet sheet conveying step 440, an infeed conveying step 450, a laser cutting step 460, a vacuum suction roller conveying step 470, an IC portion position detecting step 480, and a position correcting step 490, to the lamination step 495.

In the inlet 10c, the position of the IC portion is detected by an IC portion detecting sensor 45, and thus a distance between the position of the IC portion 10b on the vacuum suction roller 25 and the position of the base sheet where the IC portion 10b is inserted into the concave portion 50b is detected.

After comparing the respective detection results in a comparison computing step 435, how much positional correction is needed for the positions of the inlet sheet 10 and the inlet 10c is computed, and based on the detection results, a positional correction operation is performed in the position correcting step 490.

In the positional correction, a vacuum suction roller 25 is rotated for correction immediately before the lamination (from the moment the lamination of a proceeding inlet is finished to the moment the present inlet is laminated). At this time, the same operation for positional correction 490a for the vacuum suction roller 25 is reflected to the infeed conveying step 450.

With this, it is possible to prevent positional displacement of the inlet due to a difference in transfer speed between the inlet 10c on the vacuum suction roller 25 and the inlet sheet 10.

By performing the feed-back control, a continuous production can be achieved while controlling the positioning with high precision.

Second Embodiment

A production process according to a second embodiment will be described with reference to FIG. 5. An inlet sheet 10 is conveyed at a pitch on a one-sheet-paper basis by rotation driving of a cylindrical-shaped infeed roller 110, and cut into a plurality of inlets by a cutting device 120.

At this time, the communication function of an inlet 100 is tested by a testing device 115, and an inlet 100a evaluated as communication failed is removed by a rejection device 190.

Meanwhile, an inlet 100b involving no communication failure is stocked in a stocking device 130.

Subsequently, the inlet 100b is conveyed to a pick-up standby position 140a on one-sheet basis by an inlet conveyance roller 160, picked up by a pick-and-place device 140 and then transferred onto a conveyance roller 150 at an arbitral position 140b of the vacuum suction roller 150.

The subsequent steps are the same ones as in the first embodiment, and the description is omitted.

Third Embodiment

Figure 6A:
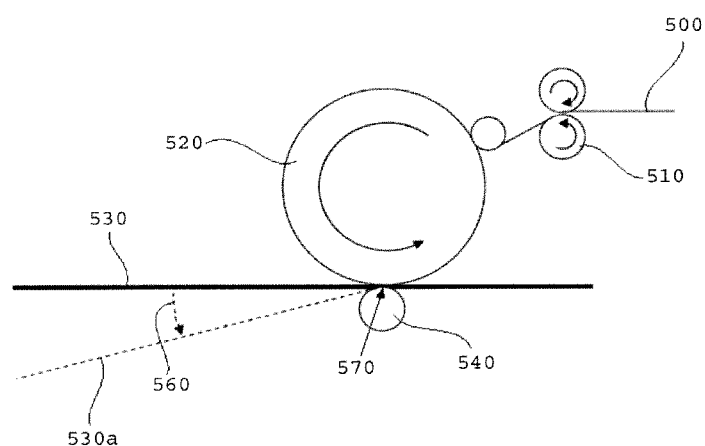
FIG. 6A is a view illustrating one example of a lamination aspect in a lamination step.

The production process according to a third embodiment will be described with reference to FIG. 6A. FIG. 6A is a view illustrating one example of a lamination aspect in a lamination step.

In this conveyance aspect, when a cut-out inlet from an inlet sheet 500 (fed through feed rollers 510 and advanced by a suction roller 520) is laminated with a base sheet 530, the base sheet 530 is allowed to enter a nip portion 570 along an inclined direction 530a so that the angle of the base sheet 530 proceeding to a position of lamination has an inclined angle 560 which is inclined perpendicularly downward a tangential direction in the nip portion 570.

By performing such lamination, it is possible to prevent inclusion of air bubbles between the inlet and the base sheet 530.

Production contents other than described above are the same as in the first embodiment, and the description is omitted.

Fourth Embodiment

Figure 6B:
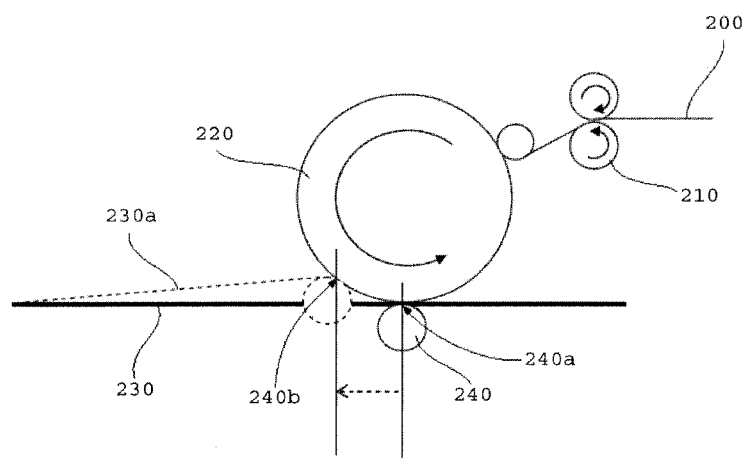
FIG. 6B is a view illustrating another example of the lamination aspect in the lamination step.

The production process according to a fourth embodiment will be described with reference to FIG. 6B. FIG. 6B is a view illustrating another example of the lamination aspect in the lamination step.

When a cut-out inlet from an inlet sheet 200 (fed through feed rollers 210) is laminated with a base sheet 230, the position of a vacuum suction roller 220 and a lamination roller 240 is set on an adsorption surface 240a of the vacuum suction roller 220 positioned perpendicularly downward as viewed from the center shaft of the vacuum suction roller 220 as seen in the first embodiment or an adsorption surface 240b positioned on the conveying side of the base sheet 230 in the transfer direction thereof with respect to the adsorption surface 240a.

When the vacuum suction roller 220 and the lamination roller 240 are disposed in the position according to the present embodiment (i.e., positioned on the adsorption surface 240b), the base sheet 230 moving to the position of lamination is allowed to enter a nip portion so that the base sheet 230 has an inclined angle (230a) inclined perpendicularly downward, with respect to the tangential direction in the nip portion. With this, it is possible to prevent inclusion of air bubbles between the inlet and the base sheet 230 during lamination.

Production contents other than described above are the same as in the first embodiment, and the description is omitted.

(Reversible Thermosensitive Recording Medium)

The reversible thermosensitive recording medium of the present invention is produced by the method for producing a reversible thermosensitive recording medium of the present invention, and includes inlets each of which has a convex-shaped electronic information recording element and an antenna circuit on a circuit board, a reversible thermosensitive recording layer, and a base sheet including a plurality of concave portions on a surface thereof opposite to a surface thereof on which the reversible thermosensitive recording layer is provided, wherein the convex-shaped electronic information recording element is laminated so as to be inserted into the concave portion.

Figure 7:
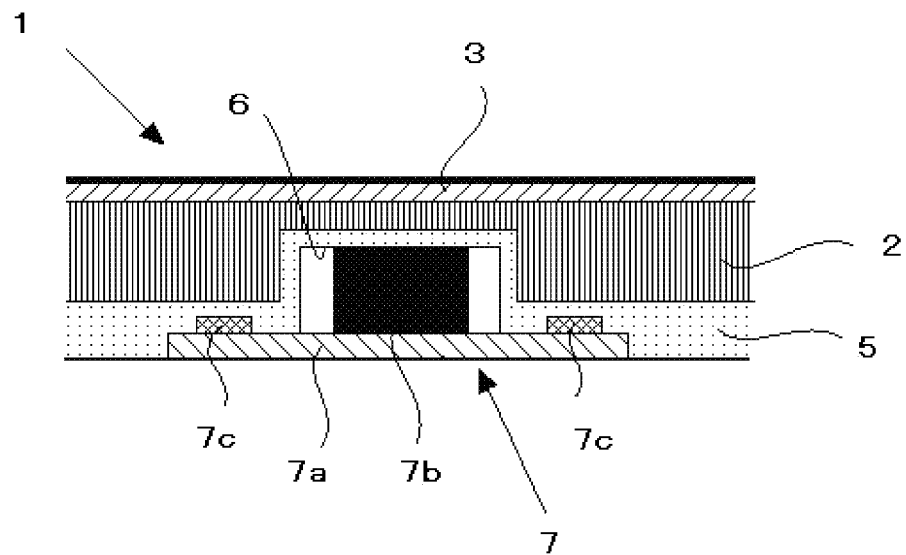
FIG. 7 is a cross-sectional view illustrating one example of a structure of a reversible thermosensitive recording medium according to the present invention.

One example of the reversible thermosensitive recording medium of the present invention is illustrated in FIG. 7. A reversible thermosensitive recording medium 1 includes a reversible thermosensitive recording layer 3, a base sheet 2 provided adjacent to the reversible thermosensitive recording layer 3, an inlet 7 having a convex-shaped IC portion 7b and an antenna circuit 7c on a circuit board 7a, and an adhesive layer 5 provided for bonding the base sheet 2 and the IC portion 7b.

Here, in the base sheet 2, a concave portion 6 is formed on a surface thereof opposite to a surface thereof on which the reversible thermosensitive recording layer 3 is provided. The inlet 7 is arranged so that the IC portion 7b is inserted into the concave portion 6 in the base sheet 2.

With use of a reversible thermosensitive recording medium 1, a close contact of the reversible thermosensitive recording medium 1 with a thermal head, an erasure bar, an erasure roller, and an erasure plate is easily performed when the reversible thermosensitive recording medium 1 is pressed against the members such as the thermal head in an image printing/erasure process by making reversible thermosensitive recording medium 1 thin and flexible. As a result of this, it is possible to eliminate nonuniformity of contact from the top surface of the recording medium by a thermal head or erasure bar and nonuniformity of contact from the bottom surface thereof by a platen roller, and it is also possible to maximize the dimensional accuracy degree thereof without causing coloring nonuniformity and erasure nonuniformity caused by contact failure, and thereby the printing quality is stabilized.

Therefore, even when image erasure and image recording is performed at high speed, recording without causing white voids and image fading and image erasure without causing unerased portions are enabled in areas with concave-convex portions each corresponding to a peripheral area of the inlet 7, a peripheral area of the IC portion 7b, a peripheral area of the antenna circuit 7c and the conductive member area, and thus excellent print quality can be obtained.

Further, provision of flexibility to the reversible thermosensitive recording medium reduces a concentrating bend load on IC swage portions, and reduces local bending. As a result of this, it is possible to obtain flexible shape restoration causing less disconnection in the IC swage portions. Further, the handleability can be obtained when the reversible thermosensitive recording medium is handled in work operation.

In addition, the IC portion 7b is inserted into the concave portion 6 of the base sheet 2, step difference or concave-convex portions caused by the IC portion 7b can be eliminated, and thereby the print quality can be improved.

EXAMPLES

Hereinafter, the present invention will be further described in detail with reference to Examples and Comparative Examples, however, the following Examples shall not be construed as limiting the scope of the present invention.

Concerning producing a reversible thermosensitive recording medium under the production conditions of the reversible recording medium according to the first embodiment, a test was further performed to review preferred production conditions. The following describes the purpose and test conditions.

Specifically, this test was performed under such conditions that an antenna circuit to be provided on an inlet was hardly covered with an adhesive material, by setting the thickness of the antenna circuit to 20 µm and applying the adhesive material onto a substrate sheet so as to have the same thickness as the antenna circuit.

The study items are described below.

(1) Conditions involving no bubble inclusion between an inlet and a base sheet, particularly in an antenna and the periphery thereof were studied.

(2) Method for suppressing generation of air bubbles was studied. In other words, as an adhesive material used in this test, a wet-curable type adhesive material which discharges carbon dioxide gas when cured in wetness is used, however, when voids including moisture (water) and air are present between an inlet and a base sheet, carbon dioxide gas is generated, and the surface of the resulting reversible thermosensitive recording medium swells. As a result, a reversible thermosensitive recording medium having no concave-convex portions on its surface cannot be obtained. Such air bubbles continuously generated for approximately three days and change the surface configuration of the recording medium.

(3) Conditions under which a difference in height between concave-convex portions of the surface on the inlet side is reduced to 25 µm or smaller were studied.

Example 1

On a vacuum suction roller (manufactured by Belmatick Co.; a slit hole-vacuum suction roller, roller diameter: 200 mm, roller forming material: metal (hardness: Hy 180)), an inlet (IC portions of HITACHI HIBIKI INLET; 1.2 mm square, thickness: 150 µm, thickness of antenna circuit portions: 50 µm (thickness of PEN (polyethylene naphthalate) base portion 30 µm+thickness of antenna circuit 20 µm), overall dimension: length 92 mm, width 25 mm) was allowed to be adsorbed in vacuum.

A concave portion (for inserting the IC portion) was formed in 2 mm square in one surface of a base sheet to be laminated with the inlet (made of a PET resin, with a thickness of 100 µm) at its center portion, and an adhesive material (produced by Henkel Technologies Japan Ltd., PUR-HM adhesive PERFECT ROCK MR900RI, which may be referred to as "PUR") was applied to an area including the concave portion in the base sheet so as to have a thickness of 20 µm, under coating conditions: coating temperature: 80° C., viscosity: 21,900 cps.

The concave portion in the base sheet and the IC portion of the inlet adsorbed to the vacuum suction roller were aligned and laminated each other between a rubber-made lamination roller (external diameter of roller: 30 mm, hardness: 40°) and the vacuum suction roller with a nip pressure of 0.03 MPa. The approach angle of the base sheet in Example 1 was 0°.

Here, the lamination was performed as follows. The surface of the base sheet coated with the adhesive material was pressed against the rotational direction side edge of the vacuum suction roller provided with the IC portion, and the vacuum suction roller was rotated from this portion so that the inlet was laminated with the base sheet from a line contact to a plane contact.

Through the above-mentioned procedure, a reversible thermosensitive recording medium of Example 1 was produced.

Example 2

A reversible thermosensitive recording medium of Example 2 was produced in the same manner as in Example 1, except that the thickness of the adhesive material to be applied was changed from 20 µm to 50 µm.

Example 3

A reversible thermosensitive recording medium of Example 3 was produced in the same manner as in Example 1, except that the coating conditions of the adhesive material were changed so that the coating temperature was changed from 80° C. to 90° C. and the viscosity was changed from 21,900 cps to 13,800 cps.

Example 4

A reversible thermosensitive recording medium of Example 4 was produced in the same manner as in Example 1, except that the surface hardness of the lamination roller was changed from 40° to 20°.

Example 5

A reversible thermosensitive recording medium of Example 5 was produced in the same manner as in Example 4, except that the nip pressure was changed from 0.03 MPa to 0.07 MPa.

Example 6

A reversible thermosensitive recording medium of Example 6 was produced in the same manner as in Example 1, except that the nip pressure was changed from 0.03 MPa to 0.07 MPa.

Example 7

A reversible thermosensitive recording medium of Example 7 was produced in the same manner as in Example 5, except that the surface hardness of the lamination roller was changed from 20° to 50°.

Example 8

A reversible thermosensitive recording medium of Example 8 was produced in the same manner as in Example 5, except that the surface hardness of the lamination roller was changed from 20° to 70°.

Example 9

A reversible thermosensitive recording medium of Example 9 was produced in the same manner as in Example 5, except that a metal roller having a surface hardness of Hv 180 was used instead of the rubber-made lamination roller having a surface hardness of 20°.

Example 10

A reversible thermosensitive recording medium of Example 10 was produced in the same manner as in Example 4, except that the nip pressure was changed from 0.03 MPa to 0.25 MPa.

Example 11

A reversible thermosensitive recording medium of Example 11 was produced in the same manner as in Example 6, except that the nip pressure was changed from 0.07 MPa to 0.25 MPa.

Example 12

A reversible thermosensitive recording medium of Example 12 was produced in the same manner as in Example 7, except that the nip pressure was changed from 0.07 MPa to 0.25 MPa.

Example 13

A reversible thermosensitive recording medium of Example 13 was produced in the same manner as in Example 8, except that the nip pressure was changed from 0.07 MPa to 0.25 MPa.

Example 14

A reversible thermosensitive recording medium of Example 14 was produced in the same manner as in Example 9, except that the nip pressure was changed from 0.07 MPa to 0.25 MPa.

Example 15

A reversible thermosensitive recording medium of Example 15 was produced in the same manner as in Example 7, except that in the lamination, the approach angle of the base sheet was set to 10°.

Example 16

A reversible thermosensitive recording medium of Example 16 was produced in the same manner as in Example 7, except that in the lamination, the position of the lamination roller was shifted toward the rotation upstream side by 30°.

Example 17

A reversible thermosensitive recording medium of Example 17 was produced in the same manner as in Example 7, except that in the lamination, the approach angle of the base sheet was set to 20°.

Example 18

A reversible thermosensitive recording medium of Example 18 was produced in the same manner as in Example 7, except that in the lamination, the approach angle of the base sheet was set to 30°.

<Method of Measuring Coating Viscosity of Adhesive Material>

The viscosity of each adhesive material was measured using a commercially available general-purpose viscometer (manufactured by Ikemoto Scientific Technology Co., Ltd., TVB-10M).

<Method of Measuring Surface Hardness of Lamination Roller>

The surface hardness of each lamination roller was measured using a commercially available general-purpose rubber hardness meter (A type) (manufactured by ASKER, JAL Model).

<Method of Measuring Air Bubble Inclusion and Evaluation Method>

Immediately after the lamination, air bubbles interposed between the base sheet and the inlet sheet was visually observed, and the size of the air bubbles was measured with a scale (vernier caliper).

[Evaluation Criteria]

A: No air bubble was observed in the circumference of the inlet antenna.

B: Air bubbles of 0 mm to 0.2 mm in size were present in the circumference of the inlet antenna.

C: Air bubbles having a size exceeding 0.2 mm but 0.6 mm or smaller were present in the circumference of the inlet antenna.

D: Air bubbles having a size exceeding 0.6 mm but 1.4 mm or smaller were present in the circumference of the inlet antenna.

E: Air bubbles having a size exceeding 1.4 mm were present in the circumference of the inlet antenna.

<Method of Measuring Edge Width of Air Bubble in Circumference of Antenna>

The edge width of air bubble (variation in size in the circumference of the antenna) was visually observed using a scale (vernier caliper).

<Method of Measuring Foamed State and Evaluation Method>

Three days later after the lamination, the foamed state was visually observed, and the size of the air bubbles and the edge size thereof in the circumference of each antenna were measured with using a scale (vernier caliper).

[Evaluation Criteria]

A: As compared with the foamed state immediately after the lamination, air bubbles and the edge size thereof in the circumference of the antenna circuit did not increase in size.

B: As compared with the foamed state immediately after the lamination, air bubbles and the edge size thereof in the circumference of the antenna circuit increased in size.

<Method of Measuring Concave-Convex Portions on Inlet Surface>

After the lamination, the thickness of each inlet provided with an antenna and the thickness of the inlet provided with no antenna were measured with a micrometer (manufactured by Mitsutoyo K.K., 389-251), and a difference in thickness therebetween was determined as a differential value (height difference) between a concave portion and a convex portion on the inlet.

TABLE 1

| | Factor of Roller (φ 30 mm) | | Factor of Coating | | |
|---|---|---|---|---|---|
| | Hardness | Pressure applied (MPa) | Temperature of PUR in coating | Viscosity of PUR in coating | Thickness of PUR (μm) |
| Ex. 1 | 40° | 0.03 MPa | 80° | 21,900 cps | 20 μm |
| Ex. 2 | 40° | 0.03 MPa | 80° | 21,900 cps | 50 μm |
| Ex. 3 | 40° | 0.03 MPa | 80° | 13,800 cps | 20 μm |
| Ex. 4 | 20° | 0.03 MPa | 80° | 21,900 cps | 20 μm |
| Ex. 5 | 20° | 0.07 MPa | 80° | 21,900 cps | 20 μm |
| Ex. 6 | 40° | 0.07 MPa | 80° | 21,900 cps | 20 μm |
| Ex. 7 | 50° | 0.07 MPa | 80° | 21,900 cps | 20 μm |
| Ex. 8 | 70° | 0.07 MPa | 80° | 21,900 cps | 20 μm |
| Ex. 9 | Metal | 0.07 MPa | 80° | 21,900 cps | 20 μm |
| Ex. 10 | 20° | 0.25 MPa to 0.3 MPa | 80° | 21,900 cps | 20 μm |
| Ex. 11 | 40° | 0.25 MPa to 0.3 MPa | 80° | 21,900 cps | 20 μm |
| Ex. 12 | 50° | 0.25 MPa to 0.3 MPa | 80° | 21,900 cps | 20 μm |
| Ex. 13 | 70° | 0.25 MPa to 0.3 MPa | 80° | 21,900 cps | 20 μm |
| Ex. 14 | Metal | 0.25 MPa to 0.3 MPa | 80° | 21,900 cps | 20 μm |
| Ex. 15 | 50° | 0.07 MPa | 80° | 21,900 cps | 20 μm |
| Ex. 16 | 50° | 0.07 MPa | 80° | 21,900 cps | 20 μm |
| Ex. 17 | 50° | 0.07 MPa | 80° | 21,900 cps | 20 μm |
| Ex. 18 | 50° | 0.07 MPa | 80° | 21,900 cps | 20 μm |

TABLE 2

| | Air bubble inclusion in circumference of antenna | Edge width of air bubble in circumference of antenna | Foamed state (diameter of air bubble) 3 days later after lamination | Difference in height between convex portion and concave portion (25 μm or smaller) (a)-(b) | Thickness of inlet provided with antenna(a) (μm) | Thickness of inlet provided with no antenna (b) (μm) |
|---|---|---|---|---|---|---|
| Ex. 1 | D | 1.0 mm | No proceeding of foaming found A | 16 | 173 | 157 |
| Ex. 2 | C | 0.2 mm to 0.7 mm | Diameter: 5 mm to 6 mm (number: 30) B | 16 | 196 | 180 |
| Ex. 3 | D | 1.0 mm | No proceeding of foaming found A | 15 | 169 | 154 |
| Ex. 4 | C | 0.2 mm to 0.7 mm | Diameter: 2.3 mm (number: 12) B | 15 | 185 | 170 |
| Ex. 5 | B | 0 mm to 0.4 mm | No proceeding of foaming found A | 20 | 166 | 146 |
| Ex. 6 | B | 0 mm to 0.5 mm | No proceeding of foaming found A | 17 | 173 | 156 |
| Ex. 7 | B | 0 mm to 0.6 mm | No proceeding of foaming found A | 21 | 175 | 154 |
| Ex. 8 | C | 0.2 mm to 0.7 mm | Diameter: 2.3 mm (number: 7) B | 19 | 172 | 153 |
| Ex. 9 | D | 1.0 mm | Diameter: 2.3 mm (number: 11) B | 19 | 175 | 156 |
| Ex. 10 | A | 0 mm | No proceeding of foaming found A | 10 | 180 | 170 |
| Ex. 11 | A | 0 mm | No proceeding of foaming found A | 11 | 179 | 168 |
| Ex. 12 | B | 0 mm to 0.3 mm | No proceeding of foaming found A | 9 | 180 | 171 |
| Ex. 13 | C | 0.2 mm to 0.7 mm | Diameter: 2.3 mm (number: 4) B | 15 | 168 | 153 |
| Ex. 14 | D | 1.0 mm | Diameter: 2.3 mm (number: 6) B | 17 | 174 | 157 |
| Ex. 15 | A | 0 mm to 0.4 mm | No proceeding of foaming found A | 18 | 180 | 162 |
| Ex. 16 | A | 0 mm to 0.4 mm | No proceeding of foaming found A | 11 | 175 | 164 |
| Ex. 17 | A | 0 mm to 0.4 mm | No proceeding of foaming found A | 15 | 175 | 160 |
| Ex. 18 | A | 0 mm to 0.4 mm | No proceeding of foaming found A | 12 | 173 | 161 |

The results described above demonstrated that to prevent inclusion of air bubbles in the circumference of each antenna, the lamination is preferably performed at a nip pressure of 0.07 MPa or higher, more preferably at a nip pressure of 0.25 MPa or higher.

It was also demonstrated that the lamination is preferably performed with a lamination roller having a surface hardness of 50° or lower, more preferably with a lamination roller having a surface hardness of 20° or lower.

Example A

A reversible thermosensitive recording medium of Example A was produced in the same manner as in Example 1, except that the nip pressure between the rubber-made lamination roller (external diameter of roller: 36 mm, surface hardness: 40°) and the vacuum suction roller was changed, as shown in Table 3-1, to a range of 0.03 MPa to 0.6 MPa.

Example B

Figure 8:
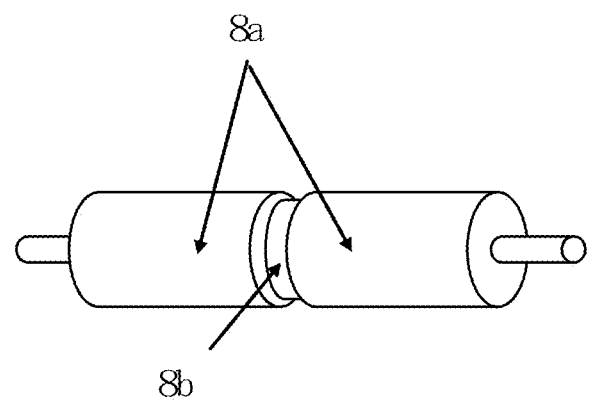
FIG. 8 is a schematic view illustrating one example of a lamination roller.

A reversible thermosensitive recording medium of Example B was produced in the same manner as in Example A, except that the rubber-made lamination roller (external diameter of roller: 36 mm, surface hardness: 40°) was changed to a roller 8a (only the center portion 8b thereof is made of metal) as illustrated in FIG. 8, and the external diameter of the center portion was changed, as shown in Table 3-1, to 35 mm, 35.2 mm, and 35.4 mm, respectively.

Example C

A reversible thermosensitive recording medium of Example C was produced in the same manner as in Example B, except that the external diameter of the roller (only the center portion thereof is made of metal) as illustrated in FIG. 8 was changed to 35.4 mm, and the temperature and the viscosity of the adhesive material were changed to the values shown in Table 3-1.

Example D

A reversible thermosensitive recording medium of Example D was produced in the same manner as in Example B, except that the external diameter of the center portion of the roller (only the center portion thereof is made of metal) as illustrated in FIG. 8 was changed to 35.4 mm, and the linear speed of thereof was changed, as shown in Table 3-1, to 2 m/min, and 4 m/min, respectively.

Example E

A reversible thermosensitive recording medium of Example E was produced in the same manner as in Example B, except that the external diameter of the center portion of the roller (only the center portion thereof is made of metal) as illustrated in FIG. 8 was changed to 35.4 mm, and the filling amount of the adhesive material to the countersunk hole portion (concave portion) was changed, as shown in Table 3-1, to −40 μm, −20 μm, +20 μm, and +40 μm, respectively.

Next, the reversible thermosensitive recording media of Examples

A to E were each evaluated for inclusion of air bubbles and the flatness of rear surface of the countersunk hole portion as follows. The evaluation results are shown in Table 3-2.

<Evaluation of Inclusion of Air Bubble>

The presence or absence of inclusion of air bubbles in a wavy inlet, the circumference of the antenna and the counter-suction hole portion was visually observed, and the size of air bubbles was measured by a scale (vernier caliper), followed by evaluation according to the following criteria.

Figure 9:
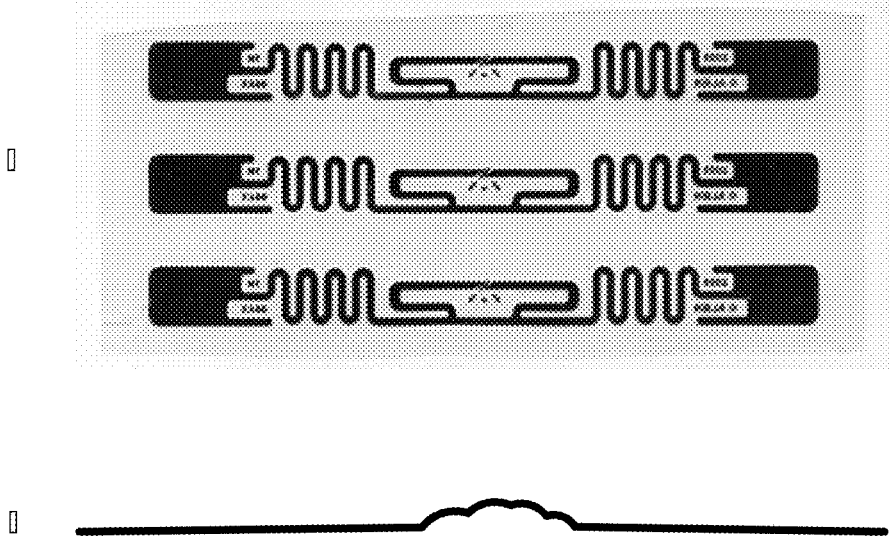
FIG. 9 is a schematic view illustrating an inlet sheet causing waviness.

Here, the "wavy inlet" means a state where a center part of an inlet is distorted or deformed by 1 mm to 2 mm, as illustrated in FIG. 9. More specifically, when a continuous inlet sheet is formed into a roll, a portion of the inlet on which an IC chip is located is thicker than the other portions, and thus the resulting roll has a roll shape in which only the peripheral portions of the IC chip are thick, and a slip-shaped protective sheet is partially present at the both sides of the IC chip part, not in the total width thereof, and thus tight winding occurs. As a result, the "wavy inlet" is introduced.

[Evaluation Criteria]

A: No air bubbles was present in the wavy inlet, the circumference of the antenna and the countersuction hole portion.

B: Air bubbles of 0 mm to 0.6 mm in size were entrapped into the wavy inlet, the circumference of the antenna and the countersuction hole portion.

C: Air bubbles of 0.7 mm to 1.4 mm in size were entrapped into the wavy inlet, the circumference of the antenna and the countersuction hole portion.

D: Air bubbles of greater than 1.4 mm in size were entrapped into the wavy inlet, the circumference of the antenna and the countersuction hole portion.

<Flatness of Rear Surface to Countersuction Hole Portion>

The flatness of the rear surface of the countersuction hole portion in each reversible thermosensitive recording medium was measured by a displacement gauge, and evaluated according to the following criteria.

[Evaluation Criteria]

A: There was no concave-convex portions in the rear surface of the countersuction hole portion, as compared with other portions.

B: Concave-convex portions of 0 μm to 10 μm in size were present in the rear surface of the countersuction hole portion, as compared with other portions.

C: Concave-convex portions of 11 μm to 30 μm in size were present in the rear surface of the countersuction hole portion, as compared with other portions.

D: Concave-convex portions of greater than 30 μm in size were present in the rear surface of the countersuction hole portion, as compared with other portions.

TABLE 3-2-continued

| | Inclusion of Air bubble | | | Flatness of rear surface to countersunk hole portion |
|---|---|---|---|---|
| | Wavy inlet | Circumference of antenna | countersunk hole portion | |
| | A No air bubble | A No air bubble | A No air bubble | C 28 μm |
| | A No air bubble | A No air bubble | A No air bubble | C 12 μm |
| Ex. B | A No air bubble | A No air bubble | A No air bubble | C 23 μm |
| | A No air bubble | A No air bubble | A No air bubble | C 24 μm |
| | A No air bubble | A No air bubble | A No air bubble | A 0 μm |
| Ex. C | A No air bubble | C 0.8 mm | C 1.0 mm | A 0 μm |
| | A No air bubble | A No air bubble | A No air bubble | B 8 μm |
| | A No air bubble | A No air bubble | A No air bubble | C 23 μm |
| | A No air bubble | A No air bubble | A No air bubble | D 45 μm |
| Ex. D | A No air bubble | A No air bubble | A No air bubble | A 0 μm |
| | A No air bubble | A No air bubble | A No air bubble | A 0 μm |
| Ex. E | A No air bubble | A No air bubble | D 2.0 mm | D 36 μm |
| | A No air bubble | A No air bubble | C 1.2 mm | D 47 μm |
| | A No air bubble | A No air bubble | A No air bubble | A 0 μm |
| | A No air bubble | A No air bubble | A No air bubble | A 0 μm |

From the results described above, the following facts were confirmed.

In Example A, a rubber-made lamination roller having a diameter different from that of the lamination roller used in Examples 1 to 18 was used, however, similar results on inclusion of air bubbles were obtained.

TABLE 3-1

| | Lamination roller | | | | | | | Filling |
|---|---|---|---|---|---|---|---|---|
| | Pressure applied (MPa) | Material | Shape | External diameter Both ends (mm) | External diameter Center (mm) | Adhesive material Temperature (° C.) | Adhesive material Viscosity (cps) | Linear speed (m/min) | amount to countersunk hole portion (μM) |
| Ex. A | 0.03 | rubber | wholly made of rubber | 36 | 36 | 80 | 21,900 | 6 | ±0 |
| | 0.07 | rubber | wholly made of rubber | 36 | 36 | 80 | 21,900 | 6 | ±0 |
| | 0.25 | rubber | wholly made of rubber | 36 | 36 | 80 | 21,900 | 6 | ±0 |
| | 0.4 | rubber | wholly made of rubber | 36 | 36 | 80 | 21,900 | 6 | ±0 |
| | 0.5 | rubber | wholly made of rubber | 36 | 36 | 80 | 21,900 | 6 | ±0 |
| | 0.6 | rubber | wholly made of rubber | 36 | 36 | 80 | 21,900 | 6 | ±0 |
| Ex. B | 0.6 | rubber + metal | only center portion: made of metal | 36 | 35 | 80 | 21,900 | 6 | ±0 |
| | 0.6 | rubber + metal | only center portion: made of metal | 36 | 35.2 | 80 | 21,900 | 6 | ±0 |
| | 0.6 | rubber + metal | only center portion: made of metal | 36 | 35.4 | 80 | 21,900 | 6 | ±0 |
| Ex. C | 0.6 | rubber + metal | only center portion: made of metal | 36 | 35.4 | 70 | 38,100 | 6 | ±0 |
| | 0.6 | rubber + metal | only center portion: made of metal | 36 | 35.4 | 100 | 9,000 | 6 | ±0 |
| | 0.6 | rubber + metal | only center portion: made of metal | 36 | 35.4 | 120 | 4,300 | 6 | ±0 |
| | 0.6 | rubber + metal | only center portion: made of metal | 36 | 35.4 | 140 | 3,500 | 6 | ±0 |
| Ex. D | 0.6 | rubber + metal | only center portion: made of metal | 36 | 35.4 | 80 | 21,900 | 2 | ±0 |
| | 0.6 | rubber + metal | only center portion: made of metal | 36 | 35.4 | 80 | 21,900 | 4 | ±0 |
| Ex. E | 0.6 | rubber + metal | only center portion: made of metal | 36 | 35.4 | 80 | 21,900 | 6 | −40 |
| | 0.6 | rubber + metal | only center portion: made of metal | 36 | 35.4 | 80 | 21,900 | 6 | −20 |
| | 0.6 | rubber + metal | only center portion: made of metal | 36 | 35.4 | 80 | 21,900 | 6 | +20 |
| | 0.6 | rubber + metal | only center portion: made of metal | 36 | 35.4 | 80 | 21,900 | 6 | +40 |

TABLE 3-2

| | Inclusion of Air bubble | | | Flatness of rear surface to countersunk hole portion |
|---|---|---|---|---|
| | Wavy inlet | Circumference of antenna | countersunk hole portion | |
| Ex. A | D 1.7 mm | C 1.0 mm | B 0.3 mm | C 27 μm |
| | D 1.5 mm | B 0.5 mm | A No air bubble | C 25 μm |
| | C 0.8 mm | A No air bubble | A No air bubble | C 18 μm |
| | B 0.4 mm | A No air bubble | A No air bubble | C 17 μm |

To prevent inclusion of air bubbles in a wavy inlet, it was found that an inlet sheet is preferably laminated at a nip pressure of 0.4 MPa or higher, and further preferably at a nip pressure of 0.5 MPa or higher.

To maintain the flatness of a countersuction hole portion after lamination of the inlet, it was found that only a center portion of a lamination roll to be contacted with the countersuction hole portion is preferably made of metal, and the diameter of the metal portion is preferably set to 35.4 mm relative to the diameter (36 mm) of rubber-made portions thereof.

It was also found that when an adhesive for laminating an inlet to prevent inclusion of air bubbles in the antenna circumference and the countersuction hole portion is a hot-melt adhesive, the temperature of the adhesive is preferably 80° C. to 100° C.

It was also found that the speed of the lamination roller during lamination of an inlet is not particularly limited as long as it is within a range of 2 m/min to 6 m/min.

Furthermore, it was found that to prevent inclusion of air bubbles in a countersuction hole portion and to maintain the flatness of the rear surface to the countersuction hole portion, the amount of the adhesive for filling the countersuction hole portion is preferably +20 μm or more.

The method for producing a reversible thermosensitive recording medium and the reversible thermosensitive recording medium production apparatus of the present invention each enables aligning, with high precision, a convex-shaped electronic information recording element with a concave portion in which the convex-shaped electronic information recording element is housed, so that the recording element is laminated on a base sheet, preventing air bubbles from being included in the reversible thermosensitive recording medium to prevent recording failure and print failure caused by concave-convexes of a surface of the recording medium, continuously producing a reversible thermosensitive recording medium with high efficiency, and further producing reversible thermosensitive recording media having a variety of different sizes; and a reversible thermosensitive recording medium, and thus the method and the production apparatus can be suitably used in production of a reversible thermosensitive recording medium having an inlet.

What is claimed is:

1. A method for producing a reversible thermosensitive recording medium, the method comprising:
    (a) conveying an inlet sheet which includes inlets each of which has a convex-shaped electronic information recording element and an antenna circuit on a circuit board,
    (b) retrieving positional information of the nlets by detecting the position of the inlets in the inlet sheet,
    (c) cutting the inlet sheet into individual inlets based on the positional information of the inlets,
    (d) retrieving positional information of the convex-shaped electronic information recording element in the individual inlets on a vacuum suction roller which is rotatable with the individual inlets being adsorbed on a surface thereof,
    (e) conveying a base sheet, which comprises a reversible thermosensitive recording layer and a plurality of concave portions in a surface thereof opposite to a surface thereof on which the reversible thermosensitive recording layer is provided, toward the vacuum suction roller,
    (f) retrieving positional information of each of the concave portions in the base sheet by detecting the position of the concave portion,
    (g) aligning the convex-shaped electronic information recording element with the concave portion based on the positional information of the convex-shaped electronic information recording element and the positional information of the concave portion, so that the convex-shaped electronic information recording element is inserted into the concave portion, and
    (h) laminating the inlets and the base sheet by allowing the base sheet to pass between the vacuum suction roller and a lamination roller after the aligning,
    wherein the detecting in (f) of the position of the concave portion is performed by a concave portion-detection sensor which detects the concave portion of a register mark indicating the position of the base sheet and outputs positional information of the concave portion which includes difference information between the position of the detected concave portion and a reference position of the concave portion set by a size of the base sheet or a pitch interval between the concave portions arranged adjacent to each other.

2. The method for producing a reversible thermosensitive recording medium according to claim 1, wherein the conveying the inlet sheet is conveying the inlet sheet onto the vacuum suction roller, and the inlet sheet is conveyed by being sandwiched between two inlet sheet-feed rollers which enables an intermittent driving operation so that conveyance of the inlet sheet and a stop of the conveyance are repeatedly performed.

3. The method for producing a reversible thermosensitive recording medium according to claim 2, wherein the retrieving the positional information of the inlets is retrieving the positional information of the inlets in the inlet sheet on the vacuum suction roller, the detecting the position of the inlets in the retrieving the positional information of the inlets is performed by an inlet detection sensor which detects a length of each of the inlets in a conveying direction thereof, and the two inlet sheet-feed rollers are feed-back controlled in the conveying based on the detection result.

4. The method for producing a reversible thermosensitive recording medium according to claim 1, wherein the cutting the inlet sheet is cutting the inlet sheet into the individual inlets on the vacuum suction roller, and the cutting of the inlet sheet in the cutting is performed while scanning the inlet sheet in motion with a laser beam.

5. The method for producing a reversible thermosensitive recording medium according to claim 4, wherein a focal length of the laser beam can be changed.

6. The method for producing a reversible thermosensitive recording medium according to claim 1, the cutting the inlet sheet is cutting the inlet sheet into the individual inlets on the vacuum suction roller, and the cutting in the cutting the inlet sheet is effected by shearing.

7. The method for producing a reversible thermosensitive recording medium according to claim 1, wherein the cutting in the cutting the inlet sheet is effected to the inlet sheet which is conveyed at the same speed as the rotational speed of the vacuum suction roller.

8. The method for producing a reversible thermosensitive recording medium according to claim 1, wherein the positional information of the convex-shaped electronic information recording element in the retrieving the positional information of the convex-shaped electronic information recording element is retrieved by detecting one of the position of the convex-shaped electronic information recording element in the inlet moving on the vacuum suction roller and an arbitrary position in the antenna circuit.

9. The method for producing a reversible thermosensitive recording medium according to claim 1, further comprising: transferring the inlets onto the vacuum suction roller by a transfer unit.

10. The method for producing a reversible thermosensitive recording medium according to claim 1, wherein the detecting the positional information of the convex-shaped electronic information recording element in the detecting the positional information of the convex-shaped electronic information recording element is performed by a convex portion-detecting sensor which detects the convex-shaped electronic information recording element and outputs positional information of the convex-shaped electronic information recording element which includes difference information between the position of the detected convex-shaped electronic information recording element and a reference position of the convex-shaped electronic information recording element set by a size of the detected inlet or a pitch interval between the convex-shaped electronic information recording elements arranged adjacent to each other.

11. The method for producing a reversible thermosensitive recording medium according to claim 1, wherein an adhesive material is applied to a surface of the base sheet provided with the concave portion, which is conveyed in the conveying.

12. The method for producing a reversible thermosensitive recording medium according to claim 1, wherein the aligning includes correcting the position of the convex-shaped electronic information recording element based on the positional information of the convex-shaped electronic information recording element and the positional information of the concave portion, while controlling a rotation drive of at least the vacuum suction roller.

13. The method for producing a reversible thermosensitive recording medium according to claim 12, wherein the correcting the position in the aligning is performed by synchronizing a pulse signal generated from the positional information of the convex-shaped electronic information recording element with a pulse signal generated from the positional information of the concave portion.

14. The method for producing a reversible thermosensitive recording medium according to claim 1, wherein the lamination roller has a surface hardness of 20° to 50°.

15. The method for producing a reversible thermosensitive recording medium according to claim 1, wherein the lamination roller comprises an elastic portion formed of an elastic material, and a metal portion formed of a metal.

16. The method for producing a reversible thermosensitive recording medium according to claim 1, wherein in the laminating, a nip pressure between the vacuum suction roller and the lamination roller, employed when the inlet is laminated with the base sheet, is 0.07 MPa to 0.3 MPa.

17. The method for producing a reversible thermosensitive recording medium according to claim 1, wherein in the laminating, the base sheet is allowed to enter a nip portion so that the base sheet has an inclined angle which is inclined toward the lamination roller side relative to a tangential direction in the nip portion when the inlet and the base sheet are laminated by the vacuum suction roller and the lamination roller.

18. The method for producing a reversible thermosensitive recording medium according to claim 17, wherein in the laminating, the lamination roller is disposed at the conveying side of the base sheet in the conveying direction thereof relative to a surface of the vacuum suction roller which adsorbs the base sheet perpendicularly disposed downward as viewed from a central shaft of the vacuum suction roller.

* * * * *